(12) United States Patent
Bjergaard et al.

(10) Patent No.: US 12,000,203 B2
(45) Date of Patent: * Jun. 4, 2024

(54) PRIVACY GLAZING STRUCTURE WITH ASYMETRICAL PANE OFFSETS FOR ELECTRICAL CONNECTION CONFIGURATIONS

(71) Applicant: Cardinal IG Company, Eden Prairie, MN (US)

(72) Inventors: Eric Bjergaard, Minneapolis, MN (US); Andrew DeMiglio, Savage, MN (US)

(73) Assignee: Cardinal IG Company, Eden Prairie, MN (US)

( * ) Notice: Subject to any disclaimer, the term of this patent is extended or adjusted under 35 U.S.C. 154(b) by 512 days.

This patent is subject to a terminal disclaimer.

(21) Appl. No.: 17/213,365

(22) Filed: Mar. 26, 2021

(65) Prior Publication Data

US 2021/0214995 A1    Jul. 15, 2021

Related U.S. Application Data

(63) Continuation of application No. 16/542,635, filed on Aug. 16, 2019, now Pat. No. 10,968,684.

(Continued)

(51) Int. Cl.
*E06B 3/67* (2006.01)
*E06B 3/663* (2006.01)
(Continued)

(52) U.S. Cl.
CPC ........ *E06B 3/6722* (2013.01); *E06B 3/66304* (2013.01); *E06B 3/66309* (2013.01);
(Continued)

(58) Field of Classification Search
CPC ............... E06B 3/6722; E06B 3/66304; E06B 3/66309; G02F 1/1343
See application file for complete search history.

(56) References Cited

U.S. PATENT DOCUMENTS 3,951,846 A ‡ 4/1976 Gavrilovic ............ C07C 255/00
252/299.65
3,953,630 A ‡ 4/1976 Roberts ............. B32B 17/10045
428/38

(Continued)

FOREIGN PATENT DOCUMENTS

CN    201226062 Y  ‡  4/2009
CN    201226062 Y     4/2009
(Continued)

OTHER PUBLICATIONS

International Patent Application No. PCT/US2019/046776, International Search Report and Written Opinion dated Jan. 2, 2020, 19 pages.‡

(Continued)

*Primary Examiner* — Paola Agudelo
(74) *Attorney, Agent, or Firm* — Fredrikson & Byron, P.A.

(57) ABSTRACT

A privacy glazing structure may include an electrically controllable optically active material that provides controlled transition between a privacy or scattering state and a visible or transmittance state. To make electrical connections with electrode layers that control the optically active material, the privacy glazing structure may include an offset pane arrangement. The structure may include first and second panes that contain an optically active material. The two panes may be sandwiched by two laminated outer panes. In some examples, the first and second panes are recessed relative to the laminated outer panes along their side edges (Continued)

to define recesses in which electrical connection features are positioned.

20 Claims, 12 Drawing Sheets

Related U.S. Application Data

(60) Provisional application No. 62/719,306, filed on Aug. 17, 2018.

(51) Int. Cl.
*G02F 1/1334* (2006.01)
*G02F 1/1343* (2006.01)
*G02F 1/155* (2006.01)

(52) U.S. Cl.
CPC .......... *G02F 1/1334* (2013.01); *G02F 1/1343* (2013.01); *G02F 1/155* (2013.01)

(56) References Cited

U.S. PATENT DOCUMENTS

| | | | | |
|---|---|---|---|---|
| 4,047,351 A ‡ | 9/1977 | Derner | ............... | B32B 17/10045 52/786.13 |
| 4,150,877 A ‡ | 4/1979 | Kobale | ................. | G02F 1/1337 349/131 |
| 4,277,294 A ‡ | 7/1981 | Orcutt | ............... | B32B 17/10045 156/102 |
| 4,284,677 A ‡ | 8/1981 | Herliczek | ......... | B32B 17/10036 428/192 |
| 4,465,340 A ‡ | 8/1984 | Suganuma | ............ | G02F 1/1533 359/266 |
| 4,587,784 A ‡ | 5/1986 | Chavy | ..................... | E06B 3/677 52/204.52 |
| 4,614,676 A ‡ | 9/1986 | Rehfeld | ............ | B32B 17/10036 428/34 |
| 4,702,566 A ‡ | 10/1987 | Tukude | ................. | G02F 1/1533 359/267 |
| 4,749,261 A ‡ | 6/1988 | McLaughlin | ..... | B32B 17/10018 349/104 |
| 4,932,608 A ‡ | 6/1990 | Heidish | ............. | B32B 17/10036 244/129.3 |
| 4,958,917 A ‡ | 9/1990 | Hashimoto | ............. | G02F 1/153 359/275 |
| 5,076,673 A ‡ | 12/1991 | Lynam | .................... | G02F 1/153 359/271 |
| 5,103,336 A ‡ | 4/1992 | Sieloff | .................... | B32B 27/36 359/253 |
| 5,111,329 A ‡ | 5/1992 | Gajewski | .......... | B32B 17/10036 359/260 |
| 5,111,629 A ‡ | 5/1992 | Baughman | ............ | E06B 3/6722 52/171.3 |
| 5,142,644 A ‡ | 8/1992 | VanSteenkiste | .... | G02F 1/13452 349/152 |
| 5,151,824 A ‡ | 9/1992 | O'Farrell | .................. | B60R 1/02 359/514 |
| 5,154,953 A ‡ | 10/1992 | de Moncuit | ...... | B32B 17/10678 428/34 |
| 5,164,853 A ‡ | 11/1992 | Shimazaki | ........ | G02F 1/133305 349/149 |
| 5,168,387 A ‡ | 12/1992 | Asakura | .............. | G02F 1/13452 349/152 |
| 5,197,242 A ‡ | 3/1993 | Baughman | ........ | B32B 17/10045 52/171.3 |
| 5,202,787 A ‡ | 4/1993 | Byker | ..................... | B60R 1/088 349/195 |
| 5,239,406 A ‡ | 8/1993 | Lynam | ................ | B32B 17/10064 359/275 |
| 5,244,557 A ‡ | 9/1993 | Defendini | ......... | B32B 17/10045 204/192.26 |
| 5,408,353 A ‡ | 4/1995 | Nichols | ............. | B32B 17/10036 359/260 |
| 5,589,958 A ‡ | 12/1996 | Lieb | ........................ | A47F 3/007 312/114 |
| 5,643,644 A ‡ | 7/1997 | Demars | ................. | C03B 23/245 428/34 |
| 5,668,663 A ‡ | 9/1997 | Varaprasad | ........... | G02F 1/1524 359/608 |
| 5,766,755 A ‡ | 6/1998 | Chaussade | ........ | B32B 17/10036 428/332 |
| 5,796,452 A ‡ | 8/1998 | Pierson | .................. | G02F 1/1345 349/143 |
| 5,855,638 A ‡ | 1/1999 | Demars | ................. | C03B 23/245 65/34 |
| 5,889,608 A ‡ | 3/1999 | Buffat | ............... | B32B 17/10174 359/273 |
| 6,001,487 A ‡ | 12/1999 | Ladang | ............. | B32B 17/10045 428/344 |
| 6,055,088 A ‡ | 4/2000 | Fix | ....................... | C03C 17/3681 359/265 |
| 6,061,105 A ‡ | 5/2000 | Nakagawa | ........... | G02F 1/1339 349/139 |
| 6,064,509 A ‡ | 5/2000 | Tonar | ..................... | B60R 1/088 359/265 |
| 6,143,209 A ‡ | 11/2000 | Lynam | ..................... | C09K 9/02 252/583 |
| 6,261,652 B1‡ | 7/2001 | Poix | ....................... | E06B 3/6612 428/34 |
| 6,280,041 B1‡ | 8/2001 | Unger | ..................... | G02F 1/161 359/604 |
| 6,297,900 B1‡ | 10/2001 | Tulloch | .................... | E06B 9/24 359/275 |
| 6,317,248 B1‡ | 11/2001 | Agrawal | ................ | G02F 1/155 340/438 |
| 6,340,963 B1‡ | 1/2002 | Anno | ............ | G02F 1/136204 345/92 |
| 6,366,391 B1‡ | 4/2002 | Hurtz | ...................... | G02F 1/155 359/265 |
| 6,373,618 B1‡ | 4/2002 | Agrawal | ................ | G02F 1/1503 359/265 |
| 6,407,847 B1‡ | 6/2002 | Poll | ............................ | E06B 3/66 359/275 |
| 6,466,298 B1‡ | 10/2002 | Fix | ....................... | C03C 17/3618 349/195 |
| 6,486,928 B1‡ | 11/2002 | Lin | .................. | B32B 17/10055 349/16 |
| 6,567,708 B1‡ | 5/2003 | Bechtel | ..................... | E06B 9/24 700/19 |
| 6,589,613 B1‡ | 7/2003 | Kunert | .................... | F24S 60/00 428/34 |
| 6,594,067 B2‡ | 7/2003 | Poll | ............................ | E06B 3/66 359/275 |
| 6,621,534 B2‡ | 9/2003 | Lin | .................. | B32B 17/10055 349/16 |
| 6,639,708 B2‡ | 10/2003 | Elkadi | ............... | B32B 17/10036 359/265 |
| 6,643,050 B2‡ | 11/2003 | Rukavina | ............ | G02F 1/1533 359/265 |
| 6,671,008 B1‡ | 12/2003 | Li | ....................... | G02F 1/13362 349/16 |
| 6,671,080 B2‡ | 12/2003 | Poll | ........................ | E06B 3/66 359/275 |
| 6,795,226 B2‡ | 9/2004 | Agrawal | ........... | B32B 17/10513 359/265 |
| 6,819,467 B2‡ | 11/2004 | Lynam | ................ | B32B 17/10513 359/275 |
| 6,829,074 B2‡ | 12/2004 | Terada | .................... | G02F 1/155 359/265 |
| 6,829,511 B2‡ | 12/2004 | Bechtel | ..................... | E06B 9/24 700/19 |
| 6,842,276 B2‡ | 1/2005 | Poll | ............................ | E06B 3/66 359/265 |
| 6,950,221 B1‡ | 9/2005 | Terada | .................... | G02F 1/155 359/266 |
| 7,002,720 B2‡ | 2/2006 | Beteille | ............ | B32B 17/10018 359/265 |

(56) References Cited

U.S. PATENT DOCUMENTS

| | | | |
|---|---|---|---|
| 7,009,665 B2 ‡ | 3/2006 | Li | G02F 1/13471 |
| | | | 349/88 |
| 7,023,600 B2 ‡ | 4/2006 | Mallya | G02F 1/1334 |
| | | | 252/299.01 |
| 7,033,655 B2 ‡ | 4/2006 | Beteille | B32B 17/10302 |
| | | | 428/1.5 |
| 7,081,929 B2 ‡ | 7/2006 | Furuki | B41J 2/465 |
| | | | 349/111 |
| 7,085,609 B2 ‡ | 8/2006 | Bechtel | E06B 9/24 |
| | | | 700/19 |
| 7,173,750 B2 ‡ | 2/2007 | Rukavina | G02F 1/153 |
| | | | 359/265 |
| 7,230,748 B2 ‡ | 6/2007 | Giron | B32B 17/10788 |
| | | | 359/265 |
| 7,300,166 B2 ‡ | 11/2007 | Agrawal | B60R 1/088 |
| | | | 359/604 |
| 7,410,328 B2 * | 8/2008 | Hamel | E02D 29/025 |
| | | | 405/262 |
| 7,423,664 B2 ‡ | 9/2008 | Ukawa | G02F 1/13476 |
| | | | 348/114 |
| 7,502,156 B2 ‡ | 3/2009 | Tonar | B60R 1/088 |
| | | | 359/265 |
| 7,505,188 B2 ‡ | 3/2009 | Niiyama | G02F 1/133502 |
| | | | 359/237 |
| 7,525,714 B2 ‡ | 4/2009 | Poll | E06B 3/66 |
| | | | 359/265 |
| 7,542,809 B2 ‡ | 6/2009 | Bechtel | E06B 9/24 |
| | | | 700/19 |
| 7,671,948 B2 ‡ | 3/2010 | Ninomiya | H04N 9/317 |
| | | | 349/117 |
| 7,719,751 B2 ‡ | 5/2010 | Egerton | E06B 9/24 |
| | | | 359/271 |
| 7,738,155 B2 ‡ | 6/2010 | Agrawal | C09K 9/02 |
| | | | 359/265 |
| 7,746,534 B2 ‡ | 6/2010 | Tonar | C03C 17/36 |
| | | | 359/265 |
| 7,817,327 B2 ‡ | 10/2010 | Derda | B32B 17/10532 |
| | | | 359/275 |
| 7,822,490 B2 ‡ | 10/2010 | Bechtel | H04L 12/403 |
| | | | 700/19 |
| 7,872,791 B2 ‡ | 1/2011 | Karmhag | G02F 1/1533 |
| | | | 359/265 |
| 7,876,400 B2 ‡ | 1/2011 | Baliga | G02F 1/1334 |
| | | | 349/74 |
| 7,887,921 B2 * | 2/2011 | Varanasi | C03C 17/3441 |
| | | | 428/432 |
| 7,906,203 B2 ‡ | 3/2011 | Hartig | C03C 17/3639 |
| | | | 428/212 |
| 7,960,854 B2 ‡ | 6/2011 | Paulus | H01Q 1/1285 |
| | | | 307/9.1 |
| 7,990,603 B2 ‡ | 8/2011 | Ash | B60J 3/04 |
| | | | 359/275 |
| 8,102,478 B2 ‡ | 1/2012 | Xue | G02F 1/133536 |
| | | | 349/16 |
| 8,164,818 B2 ‡ | 4/2012 | Collins | B32B 17/10128 |
| | | | 359/275 |
| 8,169,587 B2 ‡ | 5/2012 | Bolton | G02F 1/133351 |
| | | | 349/158 |
| 8,187,682 B2 ‡ | 5/2012 | Albrecht | B32B 17/10174 |
| | | | 428/34 |
| 8,189,254 B2 ‡ | 5/2012 | Voss | B32B 17/10174 |
| | | | 359/238 |
| 8,199,264 B2 ‡ | 6/2012 | Veerasamy | B32B 17/10036 |
| | | | 349/16 |
| 8,213,074 B1 ‡ | 7/2012 | Shrivastava | E06B 9/24 |
| | | | 359/275 |
| 8,218,224 B2 ‡ | 7/2012 | Kwak | B32B 17/10788 |
| | | | 359/265 |
| 8,219,217 B2 ‡ | 7/2012 | Bechtel | G05B 19/0421 |
| | | | 700/19 |
| 8,263,228 B2 ‡ | 9/2012 | Torr | C03C 17/3417 |
| | | | 428/432 |
| 8,289,609 B2 ‡ | 10/2012 | Lamine | B32B 17/10376 |
| | | | 359/266 |
| 8,343,571 B2 ‡ | 1/2013 | Werners | B32B 17/10761 |
| | | | 427/64 |
| 8,355,112 B2 ‡ | 1/2013 | Bolton | G02F 1/133351 |
| | | | 349/187 |
| 8,482,838 B2 ‡ | 7/2013 | Sbar | G02F 1/1533 |
| | | | 359/265 |
| 8,547,624 B2 ‡ | 10/2013 | Ash | B60J 3/04 |
| | | | 359/275 |
| 8,551,603 B2 ‡ | 10/2013 | Thompson | B32B 17/10302 |
| | | | 428/192 |
| 8,610,992 B2 ‡ | 12/2013 | Varaprasad | G02F 1/15165 |
| | | | 359/275 |
| 8,619,204 B2 ‡ | 12/2013 | Saitoh | G02F 1/1337 |
| | | | 349/13 |
| 8,643,933 B2 ‡ | 2/2014 | Brown | E06B 3/66328 |
| | | | 359/275 |
| 8,711,465 B2 ‡ | 4/2014 | Bhatnagar | B32B 17/10174 |
| | | | 359/275 |
| 8,810,889 B2 ‡ | 8/2014 | Brown | E06B 3/6722 |
| | | | 359/275 |
| 8,869,493 B2 ‡ | 10/2014 | Chubb | F25D 23/028 |
| | | | 52/786.1 |
| 8,913,215 B2 ‡ | 12/2014 | Yang | G02F 1/13718 |
| | | | 349/92 |
| 8,941,788 B2 ‡ | 1/2015 | Brecht | G02F 1/133553 |
| | | | 349/16 |
| 8,970,810 B2 ‡ | 3/2015 | Bowser | G02F 1/1333 |
| | | | 349/73 |
| 8,995,039 B2 * | 3/2015 | Bartug | C03C 17/3639 |
| | | | 359/247 |
| 9,019,588 B2 ‡ | 4/2015 | Brown | E06B 7/28 |
| | | | 359/275 |
| 9,036,242 B2 ‡ | 5/2015 | Bergh | G02F 1/13439 |
| | | | 359/275 |
| 9,091,868 B2 ‡ | 7/2015 | Bergh | G02F 1/1524 |
| 9,097,842 B2 ‡ | 8/2015 | Van Nutt | B32B 15/20 |
| 9,102,124 B2 ‡ | 8/2015 | Collins | E06B 9/24 |
| 9,128,346 B2 ‡ | 9/2015 | Shrivastava | E06B 3/6722 |
| 9,158,173 B2 ‡ | 10/2015 | Bhatnagar | B32B 17/10174 |
| 9,176,357 B2 ‡ | 11/2015 | Lam | G02F 1/0102 |
| 9,193,135 B2 ‡ | 11/2015 | Boote | B32B 17/10532 |
| 9,316,883 B2 ‡ | 4/2016 | Sbar | B32B 17/10513 |
| 9,333,728 B2 ‡ | 5/2016 | Veerasamy | B32B 17/10174 |
| 9,341,015 B2 * | 5/2016 | Fernando | G02B 5/282 |
| 9,341,909 B2 ‡ | 5/2016 | Egerton | G02F 1/157 |
| 9,389,454 B2 ‡ | 7/2016 | Yamaguchi | G02B 13/0075 |
| 9,400,411 B2 ‡ | 7/2016 | Poix | B32B 17/10293 |
| 9,436,054 B2 ‡ | 9/2016 | Brown | E06B 3/6612 |
| 9,436,055 B2 ‡ | 9/2016 | Shrivastava | E06B 3/6722 |
| 9,442,341 B2 ‡ | 9/2016 | Shrivastava | E06B 9/24 |
| 9,477,130 B2 * | 10/2016 | Dubrenat | G02F 1/161 |
| 9,494,717 B2 ‡ | 11/2016 | Reymond | C03C 17/3626 |
| 9,550,457 B2 ‡ | 1/2017 | Green | G02F 1/0107 |
| 9,568,799 B2 ‡ | 2/2017 | Lam | G02C 7/102 |
| 9,581,877 B2 ‡ | 2/2017 | Bass | E06B 9/24 |
| 9,606,411 B2 ‡ | 3/2017 | Bergh | G02F 1/153 |
| 9,606,412 B2 ‡ | 3/2017 | Geerlings | G02F 1/163 |
| 9,618,819 B2 ‡ | 4/2017 | Egerton | G02F 1/13336 |
| 9,618,820 B2 * | 4/2017 | Conklin | H01L 31/0488 |
| 9,625,783 B2 ‡ | 4/2017 | Bjornard | G02F 1/153 |
| 9,664,976 B2 ‡ | 5/2017 | Rozbicki | H02J 50/20 |
| 9,690,162 B2 ‡ | 6/2017 | Wilbur | H01R 12/79 |
| 9,726,925 B2 ‡ | 8/2017 | Relot | G02F 1/1334 |
| 9,766,496 B2 ‡ | 9/2017 | Cammenga | G02F 1/161 |
| 9,810,963 B2 ‡ | 11/2017 | Gauthier | B23K 26/402 |
| 9,829,763 B2 ‡ | 11/2017 | Friedman | E06B 9/24 |
| 9,857,657 B2 ‡ | 1/2018 | Ash | G09G 3/38 |
| 9,891,454 B2 ‡ | 2/2018 | Zhang | G02F 1/1339 |
| 9,927,609 B2 ‡ | 3/2018 | Cammenga | E06B 3/6722 |
| 9,939,702 B2 ‡ | 4/2018 | Bjornard | G02F 1/163 |
| 9,952,481 B2 ‡ | 4/2018 | Rozbicki | G02F 1/153 |
| 9,958,750 B2 ‡ | 5/2018 | Parker | B32B 17/10128 |
| 9,958,751 B2 * | 5/2018 | Bergh | G02F 1/153 |
| 9,963,383 B2 ‡ | 5/2018 | Veerasamy | C03C 17/366 |
| 9,971,194 B2 ‡ | 5/2018 | Brecht | G02F 1/13718 |
| 9,989,822 B2 ‡ | 6/2018 | Galstian | G02F 1/1313 |

(56) References Cited

U.S. PATENT DOCUMENTS

| | | | |
|---|---|---|---|
| 10,705,363 B2 * | 7/2020 | Berner | E06B 9/24 |
| 10,866,480 B2 * | 12/2020 | Le Houx | B32B 17/10467 |
| 11,243,421 B2 * | 2/2022 | Schleder | E06B 9/24 |
| 2004/0233379 A1 ‡ | 11/2004 | Kinoshita | G02F 1/1341 |
| | | | 349/158 |
| 2005/0002081 A1 ‡ | 1/2005 | Beteille | B32B 17/10477 |
| | | | 359/275 |
| 2005/0132558 A1 ‡ | 6/2005 | Hennessy | E06B 3/677 |
| | | | 29/525 |
| 2005/0233125 A1 ‡ | 10/2005 | Anderson | B32B 17/10174 |
| | | | 428/221 |
| 2008/0089073 A1 ‡ | 4/2008 | Hikmet | C09K 19/3477 |
| | | | 362/311.06 |
| 2008/0317977 A1 ‡ | 12/2008 | Wu | G02F 1/1334 |
| | | | 428/1.21 |
| 2009/0246426 A1 ‡ | 10/2009 | Wu | E06B 3/66 |
| | | | 428/34 |
| 2009/0279004 A1 ‡ | 11/2009 | Greenall | B32B 17/10357 |
| | | | 349/16 |
| 2009/0303565 A1 ‡ | 12/2009 | Karmhag | G02F 1/1533 |
| | | | 359/265 |
| 2010/0028585 A1 ‡ | 2/2010 | Shimatani | B32B 17/10045 |
| | | | 428/38 |
| 2010/0279125 A1 ‡ | 11/2010 | Buyuktanir | C09K 19/0225 |
| | | | 428/432 |
| 2011/0007253 A1 ‡ | 1/2011 | Stocq | G02F 1/1334 |
| | | | 349/122 |
| 2011/0181820 A1 ‡ | 7/2011 | Watanabe | G02B 5/26 |
| | | | 349/115 |
| 2012/0086904 A1 ‡ | 4/2012 | Oki | B32B 17/10678 |
| | | | 349/201 |
| 2012/0094118 A1 ‡ | 4/2012 | Oki | G02B 5/208 |
| | | | 428/354 |
| 2012/0200908 A1 ‡ | 8/2012 | Bergh | G02F 1/1523 |
| | | | 359/275 |
| 2012/0327499 A1 ‡ | 12/2012 | Parker | B32B 38/105 |
| | | | 359/275 |
| 2013/0107563 A1 ‡ | 5/2013 | McCabe | B60R 1/1207 |
| | | | 362/540 |
| 2013/0265511 A1 ‡ | 10/2013 | Poix | G02F 1/1334 |
| | | | 349/33 |
| 2014/0020851 A1 ‡ | 1/2014 | Ouzts | E06B 9/264 |
| | | | 160/107 |
| 2014/0041933 A1 ‡ | 2/2014 | Snyker | H02G 3/30 |
| | | | 174/70 R |
| 2014/0204294 A1 ‡ | 7/2014 | Lv | G02B 5/3016 |
| | | | 349/16 |
| 2014/0211129 A1 ‡ | 7/2014 | Bowser | G02F 1/1334 |
| | | | 349/73 |
| 2014/0247475 A1 ‡ | 9/2014 | Parker | G02F 1/161 |
| | | | 359/275 |
| 2015/0049270 A1 ‡ | 2/2015 | Zhang | G02F 1/13306 |
| | | | 349/33 |
| 2015/0049378 A1 ‡ | 2/2015 | Shrivastava | G02F 1/161 |
| | | | 359/275 |
| 2015/0103389 A1 ‡ | 4/2015 | Klawuhn | G02F 1/163 |
| | | | 359/275 |
| 2015/0116649 A1 ‡ | 4/2015 | Watanabe | G02B 5/282 |
| | | | 349/176 |
| 2015/0118869 A1 ‡ | 4/2015 | Brown | H01R 41/00 |
| | | | 439/39 |
| 2015/0151613 A1 ‡ | 6/2015 | Weng | B60J 3/04 |
| | | | 250/214 AL |
| 2015/0159339 A1 * | 6/2015 | Castonguay | E04B 2/8635 |
| | | | 52/426 |
| 2015/0219975 A1 ‡ | 8/2015 | Phillips | G02F 1/13306 |
| | | | 359/275 |
| 2015/0277165 A1 ‡ | 10/2015 | Burrows | G02F 1/1339 |
| | | | 349/16 |
| 2015/0346575 A1 ‡ | 12/2015 | Bhatnagar | B32B 17/10513 |
| | | | 359/275 |
| 2015/0370140 A1 ‡ | 12/2015 | Bertolini | B60J 1/001 |
| | | | 359/275 |
| 2015/0378189 A1 ‡ | 12/2015 | Kim | G02F 1/1337 |
| | | | 349/86 |
| 2016/0026061 A1 ‡ | 1/2016 | O'Keeffe | G02F 1/1677 |
| | | | 359/296 |
| 2016/0085129 A1 ‡ | 3/2016 | Cammenga | B23K 26/352 |
| | | | 359/275 |
| 2016/0085131 A1 ‡ | 3/2016 | Lam | G02F 1/157 |
| | | | 359/244 |
| 2016/0096344 A1 * | 4/2016 | Kurihara | B32B 17/10532 |
| | | | 428/34 |
| 2016/0124284 A1 ‡ | 5/2016 | O'Keeffe | G02F 1/167 |
| | | | 359/296 |
| 2016/0138328 A1 ‡ | 5/2016 | Behmke | G02F 1/161 |
| | | | 349/16 |
| 2016/0161818 A1 ‡ | 6/2016 | Gregard | G02F 1/153 |
| | | | 359/265 |
| 2016/0187753 A1 * | 6/2016 | Sbar | C03B 33/076 |
| | | | 156/256 |
| 2016/0243773 A1 ‡ | 8/2016 | Wang | B32B 17/10706 |
| 2016/0312523 A1 ‡ | 10/2016 | Miyasaka | E06B 9/24 |
| 2016/0363831 A1 ‡ | 12/2016 | Ash | G02F 1/13318 |
| 2016/0377951 A1 ‡ | 12/2016 | Harris | G02F 1/13452 |
| | | | 359/296 |
| 2017/0028686 A1 ‡ | 2/2017 | Wilson | B32B 7/05 |
| 2017/0122028 A1 ‡ | 5/2017 | Suzuka | G02F 1/1347 |
| 2017/0139302 A1 ‡ | 5/2017 | Tonar | B60R 1/088 |
| 2017/0152702 A1 * | 6/2017 | Chang | G02F 1/1334 |
| 2017/0218686 A1 ‡ | 8/2017 | Galstian | E06B 9/24 |
| 2017/0219908 A1 ‡ | 8/2017 | Brown | E06B 7/28 |
| 2017/0328121 A1 ‡ | 11/2017 | Purdy | E06B 3/2605 |
| 2017/0371218 A1 ‡ | 12/2017 | Kailasam | G02F 1/153 |
| 2018/0011383 A1 ‡ | 1/2018 | Higashihara | G02F 1/153 |
| 2018/0088431 A1 ‡ | 3/2018 | Holt | G02F 1/157 |
| 2018/0095337 A1 ‡ | 4/2018 | Rozbicki | G02F 1/155 |
| 2018/0101080 A1 ‡ | 4/2018 | Gauthier | G02F 1/1339 |
| 2018/0224689 A1 | 8/2018 | Demiglio et al. | |
| 2018/0252975 A1 ‡ | 9/2018 | Endoh | G02F 1/161 |
| 2018/0307111 A1 * | 10/2018 | Le Houx | B32B 17/10045 |
| 2019/0002328 A1 ‡ | 1/2019 | Lezzi | C03B 27/0404 |
| 2019/0018277 A1 ‡ | 1/2019 | Berner | B32B 17/10513 |
| 2019/0137796 A1 ‡ | 5/2019 | Bjergaard | G02F 1/13306 |
| 2019/0137797 A1 ‡ | 5/2019 | Bjergaard | E06B 3/6722 |
| 2021/0302770 A1 * | 9/2021 | Seffer | E06B 9/24 |
| 2022/0107522 A1 * | 4/2022 | Popov | G02F 1/13345 |
| 2022/0121076 A1 * | 4/2022 | Neander | G02F 1/155 |

FOREIGN PATENT DOCUMENTS

| | | | |
|---|---|---|---|
| CN | 101775953 A | | 7/2010 |
| CN | 101775953 A | ‡ | 7/2010 |
| CN | 104067165 A | | 9/2014 |
| CN | 203858432 U | | 10/2014 |
| CN | 203858432 U | ‡ | 10/2014 |
| CN | 105044965 A | ‡ | 11/2015 |
| CN | 105044965 A | | 11/2015 |
| CN | 105334656 A | | 2/2016 |
| CN | 105334656 A | ‡ | 2/2016 |
| CN | 205176432 U | | 4/2016 |
| CN | 205176432 U | ‡ | 4/2016 |
| CN | 105569519 A | | 5/2016 |
| CN | 104948080 B | | 6/2016 |
| CN | 104948080 B | ‡ | 6/2016 |
| CN | 205297172 U | | 6/2016 |
| CN | 205297172 U | ‡ | 6/2016 |
| CN | 205558664 U | ‡ | 9/2016 |
| CN | 205558664 U | | 9/2016 |
| CN | 206035269 U | ‡ | 3/2017 |
| CN | 206035269 U | | 3/2017 |
| CN | 206352460 U | ‡ | 7/2017 |
| CN | 206352460 U | | 7/2017 |
| CN | 107160775 A | | 9/2017 |
| CN | 107288492 A | | 10/2017 |
| CN | 107288492 A | ‡ | 10/2017 |
| CN | 107327250 A | | 11/2017 |
| CN | 107327250 A | ‡ | 11/2017 |
| CN | 206737720 U | | 12/2017 |

(56) References Cited

FOREIGN PATENT DOCUMENTS

| | | | | |
|---|---|---|---|---|
| CN | 206737720 U ‡ | 12/2017 | | |
| CN | 206801372 U | 12/2017 | | |
| CN | 206801372 U ‡ | 12/2017 | | |
| CN | 206848627 U | 1/2018 | | |
| CN | 206848627 U ‡ | 1/2018 | | |
| CN | 207004397 U | 2/2018 | | |
| CN | 207004397 U ‡ | 2/2018 | | |
| CN | 108025953 A | 5/2018 | | |
| DE | 4121385 A1 | 1/1993 | | |
| DE | 4121385 A1 ‡ | 1/1993 | ............... | H05B 3/86 |
| EP | 978620 A2 | 2/2000 | | |
| EP | 978620 A2 ‡ | 2/2000 | | |
| EP | 2093051 A1 | 8/2009 | | |
| EP | 2093051 A1 ‡ | 8/2009 | | |
| EP | 2256545 A1 ‡ | 12/2010 | ......... | G02F 1/13781 |
| EP | 2256545 A1 | 12/2010 | | |
| EP | 2860580 A1 | 4/2015 | | |
| EP | 3538363 A1 | 9/2019 | | |
| GB | 2546987 A ‡ | 8/2017 | ........... | G02F 1/1334 |
| GB | 2546987 A | 8/2017 | | |
| JP | 62071930 A | 4/1987 | | |
| JP | 62071930 A ‡ | 4/1987 | | |
| JP | 01202713 A | 8/1989 | | |
| JP | H01202713 A ‡ | 8/1989 | | |
| JP | 2004182484 A ‡ | 7/2004 | | |
| JP | 2004182484 A | 7/2004 | | |
| JP | 2017068196 A | 4/2017 | | |
| JP | 2017068196 A ‡ | 4/2017 | | |
| KR | 20130037600 A ‡ | 4/2013 | | |
| KR | 20130037600 A | 4/2013 | | |
| TW | 201531739 A | 8/2015 | | |
| WO | 2005084378 A2 | 9/2005 | | |
| WO | WO-2005084378 A2 ‡ | 9/2005 | ............. | H01G 9/155 |
| WO | 2008090438 A2 | 7/2008 | | |
| WO | WO-2008090438 A2 ‡ | 7/2008 | ............... | E06B 9/24 |
| WO | 2010100807 A1 | 9/2010 | | |
| WO | WO-2010100807 A1 ‡ | 9/2010 | | |
| WO | 2012111715 A1 | 8/2012 | | |
| WO | WO-2012111715 A1 ‡ | 8/2012 | | |
| WO | 2013163107 A1 | 10/2013 | | |
| WO | 2014032023 A1 | 2/2014 | | |
| WO | WO-2014032023 A1 ‡ | 2/2014 | ............. | G02F 1/161 |
| WO | 2015059029 A1 | 4/2015 | | |
| WO | WO-2015059029 A1 ‡ | 4/2015 | | |
| WO | 2015100419 A1 | 7/2015 | | |
| WO | WO-2015100419 A1 ‡ | 7/2015 | ............. | G02F 1/153 |
| WO | 2015117736 A1 | 8/2015 | | |
| WO | WO-2015117736 A1 ‡ | 8/2015 | | |
| WO | 2016008375 A1 | 1/2016 | | |
| WO | WO-2016008375 A1 ‡ | 1/2016 | | |
| WO | 2016043164 A1 | 3/2016 | | |
| WO | WO-2016043164 A1 ‡ | 3/2016 | | |
| WO | 2017008881 A1 | 1/2017 | | |
| WO | 2017011268 A1 | 1/2017 | | |
| WO | WO-2017008881 A1 ‡ | 1/2017 | | |
| WO | WO-2017011268 A1 ‡ | 1/2017 | | |
| WO | 2017183692 A1 | 10/2017 | | |
| WO | WO-2017183692 A1 ‡ | 10/2017 | | |
| WO | 2017198585 A1 | 11/2017 | | |
| WO | 2017213191 A1 | 12/2017 | | |
| WO | 2018086400 A1 | 5/2018 | | |
| WO | WO-2018086400 A1 ‡ | 5/2018 | | |
| WO | 2018148446 A1 | 8/2018 | | |
| WO | 2020020804 A1 | 1/2020 | | |

OTHER PUBLICATIONS

International Patent Application No. PCT/US2019/046776, Invitation to Pay Additional Fees and Partial Search Report dated Oct. 29, 2019, 17 pages.‡

Bortolozzo et al., "Transmissive Liquid Crystal Light-valve for Near-Infrared Applications," Appl. Opt., 52(22):E73-E77, Aug. 2013.

International Patent Application No. PCT/US2019/046776, Invitation to Pay Additional Fees and Partial Search Report mailed Oct. 29, 2019, 17 pages.

International Patent Application No. PCT/US2019/046776, International Search Report and Written Opinion mailed Jan. 2, 2020, 19 pages.

European Patent Office, "Extended European Search Report", from EP Application No. 23185910.9, Mailed Jan. 24, 2024, pp. 1-12.

\* cited by examiner
‡ imported from a related application

PRIVACY GLAZING STRUCTURE WITH ASYMETRICAL PANE OFFSETS FOR ELECTRICAL CONNECTION CONFIGURATIONS

CROSS-REFERENCE

This application is a continuation of U.S. patent application Ser. No. 16/542,635, filed Aug. 16, 2019, which claims the benefit of U.S. Provisional Patent Application No. 62/719,306, filed Aug. 17, 2018. The entire contents of each of these applications are incorporated herein by reference.

TECHNICAL FIELD

This disclosure relates to structures that include an electrically controllable optically active material and, more particularly, to electrical connection configurations for glazing structures that include an electrically controllable optically active material.

BACKGROUND

Windows, doors, partitions, and other structures having controllable light modulation have been gaining popularity in the marketplace. These structures are commonly referred to as "smart" structures or "privacy" structures for their ability to transform from a transparent state in which a user can see through the structure to a private state in which viewing is inhibited through the structure. For example, smart windows are being used in high-end automobiles and homes and smart partitions are being used as walls in office spaces to provide controlled privacy and visual darkening.

A variety of different technologies can be used to provide controlled optical transmission for a smart structure. For example, electrochromic technologies, photochromic technologies, thermochromic technologies, suspended particle technologies, and liquid crystal technologies are all being used in different smart structure applications to provide controllable privacy. The technologies generally use an energy source, such as electricity, to transform from a transparent state to a privacy state or vice versa.

In instances where controlled transmission is provided through application or removal of electrical energy, the optical transmission structure can include electrode contacts where electrical wiring interfaces with electrode layers that control the optically controllable medium. The electrode contacts can provide a physical and electrical connection between the electrode layers of the optical transmission structure and wiring extending out of the structure to a power source.

SUMMARY

In general, this disclosure is directed to privacy structures incorporating an electrically controllable optically active material that provides controllable privacy. The term privacy structure includes privacy cells, privacy glazing structures, smart cells, smart glazing structure, and related devices that provide controllable optical activity and, hence, visibility through the structure. Such structures can provide switchable optical activity that provides controllable darkening, controllable light scattering, or both controllable darkening and controllable light scattering. Controllable darkening refers to the ability of the optically active material to transition between a high visible light transmission state (a bright state), a low visible light transmission dark state, and optionally intermediate states therebetween, and vice versa, by controlling an external energy source applied to the optically active material. Controllable light scattering refers to the ability of the optically active material to transition between a low visible haze state, a high visible haze state, and optionally intermediate states therebetween, and vice versa, by controlling an external energy source. Thus, reference to the terms "privacy" and "privacy state" in the present disclosure does not necessarily require complete visible obscuring through the structure (unless otherwise noted). Rather, different degrees of privacy or obscuring through the structure may be achieved depending, e.g., on the type of optically active material used and the conditions of the external energy source applied to the optically active material.

A privacy structure according to the disclosure can be implemented in the form of a window, door, skylight, interior partition, or yet other structure where controllable visible transmittance is desired. In any case, the privacy structure may be fabricated from multiple panes of transparent material that include an electrically controllable medium between the panes. Each pane of transparent material can carry an electrode layer, which may be implemented as a layer of electrically conductive and optically transparent material deposited over the pane. The optically active material may be controlled, for example via an electrical driver communicatively coupled to the electrode layers, by controlling the application and/or removal of electrical energy to the optically active material. For example, application and/or removal of electrical energy from the optically active material can cause the optically active material to transition from a scattering state in which visibility through the structure is inhibited to a transparent state in which visibility through the structure is comparatively clear.

To establish an electrical pathway between a power source and the electrode layers, the structure may include one or more electrodes bonded to each electrode layer. Each electrode may be formed of an electrically conductive material that provides a physical and/or electrical interface between the electrode layer to which the electrode is attached and an elongated electrical conductor, such as electrical wiring. The elongated electrical conductor can traverse from the electrode to a power source, such as a driver, which may be integrated with or external from the privacy structure.

In some configurations according to the present disclosure, a privacy structure is configured with offset panes to facilitate the positioning and/or routing of various electrical connection components of the structure. For example, the privacy structure may include two panes that carry electrode layers and bound an electronically controllable optically active material. The two panes may be offset from each other in one or more dimensions to create a recess in the region of offset. For example, a first pane may project laterally past an edge of a second pane on one side, while the second pane may project laterally past an edge of the first pane on an opposite side. The projecting portion of each respective pane may provide an exposed section of electrode layer carried on the face of the pane. Accordingly, one or more electrodes can be attached to the electrode layer in the projecting region of the pane.

In some configurations, the panes bounding the electronically controllable optically active material are each laminated to an outer pane, creating a sandwiched structure that includes at least four panes of material. When so configured, one or more of the recessed sections in which a pane projects to expose a section of electrode layer may be bounded on one side by an opposed outer pane. The opposed outer pane bounding the recessed section can provide physical protection for electrical connection feature(s) located in the recessed space.

A privacy structure according to some example configurations of the disclosure may have panes that are asymmetrically positioned relative to each other in different dimensions, such as on different edge faces. For example, the panes bounding the electronically controllable optically active material may be laterally offset relative to one or more outer sandwiching panes and/or each other to define a recessed section. However, the bottom edges of the panes bounding the electronically controllable optically active material may be flush with each other and/or one or more outer sandwiching panes. Configuring the privacy structure with panes whose bottom edges are positioned flush with each other may be useful to maintain the strength and structural integrity of the unit over an extended service life, which in the case of windows and doors can last decades.

When the privacy glazing structure is installed in an upright configuration with a gravitational vector extending in a direction from the top toward the bottom of the structure, the gravitational forces acting on the structure may have a tendency to cause vertical shifting or misalignment of the panes. By configuring the privacy glazing structure with panes whose bottom edges are positioned flush with each other, the bottom edges of the panes may be uniformly supported against gravitational forces. For example, the bottom edges of the panes may be positioned in and supported by a sash of a window or door and/or other planar support surface extending across and in contact with the bottom edges of the panes. This arrangement may prevent the panes from moving in the vertical dimension, e.g., due to gravitational forces, over an extended service life of the structure.

While the privacy glazing structure can have a variety of different designs and features as described herein, in some configurations, the privacy glazing structure includes a top recess. For example, the top edges of the panes bounding the electronically controllable optically active material may be offset relative to each other and/or relative to one or more outer sandwiching panes to define a top recessed section. The top recessed section may provide space for routing one or more elongated electrical conductors extending in lateral recesses from the electrode(s) bounded to the electrode layer. The depth of the top recess may be the same as or different than the depth of the lateral recesses. For example, the lateral recesses may be deeper than the top recess. Limiting the depth of the top recess can be useful in some configurations, for example, to minimize the amount of space in which moisture or other downwardly-falling contaminants may collect.

Independent of the specific positioning of the panes of the privacy structure relative to each other, in some configurations, the electrode layers on the panes are configured to reduce or eliminate potential electrical shorting in the event of moisture ingress. To accomplish this, the electrode layers may be positioned on the inner face of each pane offset from the peripheral edges of the pane. For example, rather than having the electrode layer extend across the entire face of the pane directly up to the peripheral edges of the pane, the electrode layer may be offset a distance from the peripheral edges of the pane. The offset may be created, for example, by depositing the electrode layer offset from the peripheral edges of the pane and/or by depositing the electrode layer up to the peripheral edges of the pane and thereafter removing a region of the electrode layer around the peripheral edge. The electrode layer may be removed, for example, using laser ablation and/or mechanical grinding. Offsetting the electrode layer a distance from the peripheral edges of the pane on which the electrode layer is deposited can help reduce or eliminate the likelihood that electrical shorting will occur in moisture bypasses an edge seal at the peripheral edge of the pane.

While the electrode layer may be offset from the peripheral edges of the pane around a portion of the pane, in practice, the electrode layer may need to extend closer to (and, optionally, up to) the peripheral edge of the pane in the region where the electrode is bonded to the electrode layer. Otherwise, the electrode may need to be bonded to the electrode layer in a region of the electrode layer that is visible to an observer looking through the structure. This region of the electrode layer extending closer to the peripheral edge may define an electrode contact pad to which the electrode is bonded. In some examples, the electrode contact pad is positioned on a side of the pane other than the bottom side. For example, the electrode contact pad may be positioned on a top side or lateral side of the pane spaced a distance from the bottom edge of the pane. Accordingly, the electrode layer may be offset from the peripheral edges of the pane along the bottom edge and at least partially upwardly from the bottom edge along the side edges of the pane while still accommodating the electrode contact pad. Since water may have a tendency to collect and pool (e.g., in a sash) along the bottom of the privacy structure, positioning the electrode contact pad a spaced distance from the bottom edge and offsetting the electrode layer from the peripheral edges in this region may provide additional protections against moisture ingress.

In one example, a privacy glazing structure is described that includes first, second, third, and fourth panes of transparent material as while as first and second laminate layers and an electrically controllable optically active material. The first pane of transparent material has an inner face, an outer face, a top edge, a bottom edge, a first side edge, and a second side edge. The second pane of transparent material has an inner face, an outer face, a top edge, a bottom edge, a first side edge, and a second side edge. The third pane of transparent material has a top edge, a bottom edge, a first side edge, and a second side edge. The fourth pane of transparent material has a top edge, a bottom edge, a first side edge, and a second side edge. The example specifies that the first laminate layer bonds the out face of the first pane of transparent material to the third pane of transparent material and the second laminate layer bonds the out face of the second pane of transparent material to the fourth pane of transparent material. The electrically controllable optically active material is positioned between the first pane of transparent material and the second pane of transparent material. The example states that the first side edge of the first pane of transparent material is recessed relative to the first side edge of the third pane of transparent material and the first side edge of the fourth pane of transparent material. In addition, the second side edge of the second pane of transparent material is recessed relative to the second side edge of the third pane of transparent material and the second side edge of the fourth pane of transparent material. Further, the bottom edge of the first pane of transparent material is flush with the bottom edge of the second pane of transparent material, the bottom edge of the third pane of transparent material, and the bottom edge of the fourth pane of transparent material.

The details of one or more examples are set forth in the accompanying drawings and the description below. Other features, objects, and advantages will be apparent from the description and drawings, and from the claims.

DETAILED DESCRIPTION

In general, the present disclosure is generally directed to privacy structure configurations and electrical connection configurations for privacy structures. The privacy structure may be an optical structure that includes an electrically controllable optically active material that provides controlled transition between a privacy or scattering state and a visible or transmittance state. To make electrical connections with electrode layers that control the optically active material, the optical structure may include electrode engagement regions. In some examples, the electrode engagement regions are formed by offsetting panes carrying the electrode layers relative to each other and/or relative to outer sandwiching panes. This can provide lateral recesses exposing electrode engagement regions of the electrode layer to which one or more electrodes can be physically and/or electrically coupled. While the panes carrying the electrode layers may be laterally offset, the bottom edges of the panes may be flush with each other and/or with the bottom edges of outer sandwiching panes. For example, the bottom edges of the different panes may be flush with each other and positioned in contact with a sash that supports the panes against vertical movement due to gravitational forces. As used herein, the term "flush" means that the surfaces of the edges defining the thickness of the panes are co-planar (in the X-Y plane, where the Z-direction is the vertical dimension in which gravity acts). For example, when flush, the edges may be placed on a flat surface (e.g., of a conveyance roller or piece of processing equipment, bottom surface of a sash) without causing the structure to tilt toward one side or the other because of unevenness of the flush edges. As used herein, the term "edge" means the line or line segment that is the intersection of two plane faces and includes the surface encompassing the edge. For examples, reference to the top edge of a pane means the top surface of the pane up to the edge but not including the inner face, outer face, or side surfaces of the pane.

Figure 1:
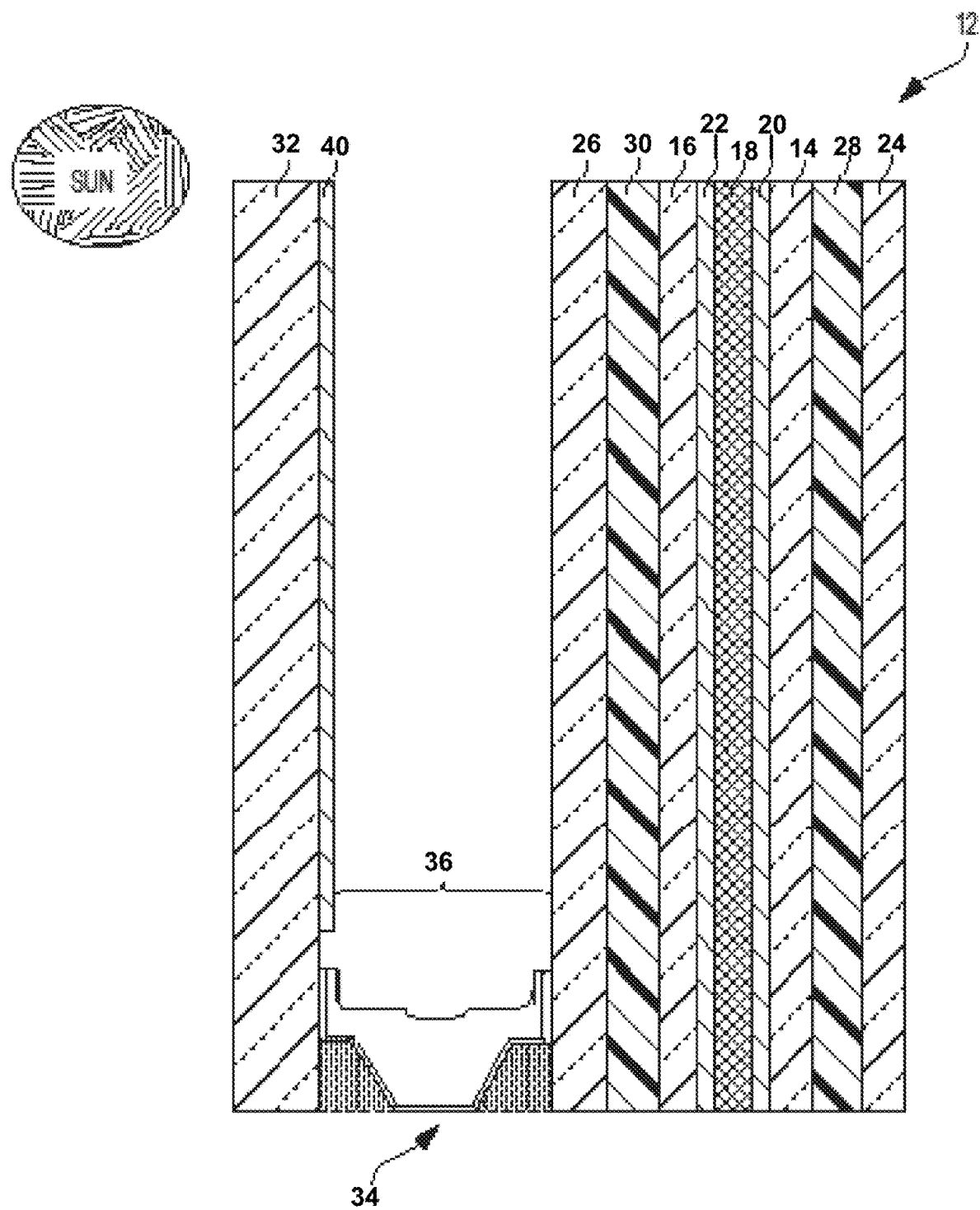
FIG. 1 is a side view of an example privacy glazing structure that may be implemented with offset panes according to the disclosure.
Figure 5:
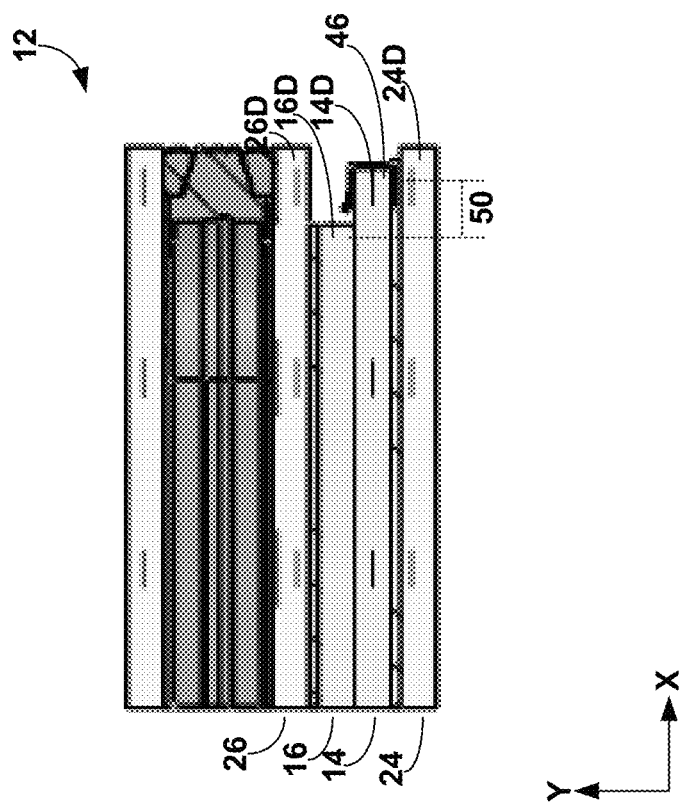
FIG. 5 is a second side view of the privacy glazing structure taken along the C-C sectional line indicated on FIG. 3.
Figure 4:
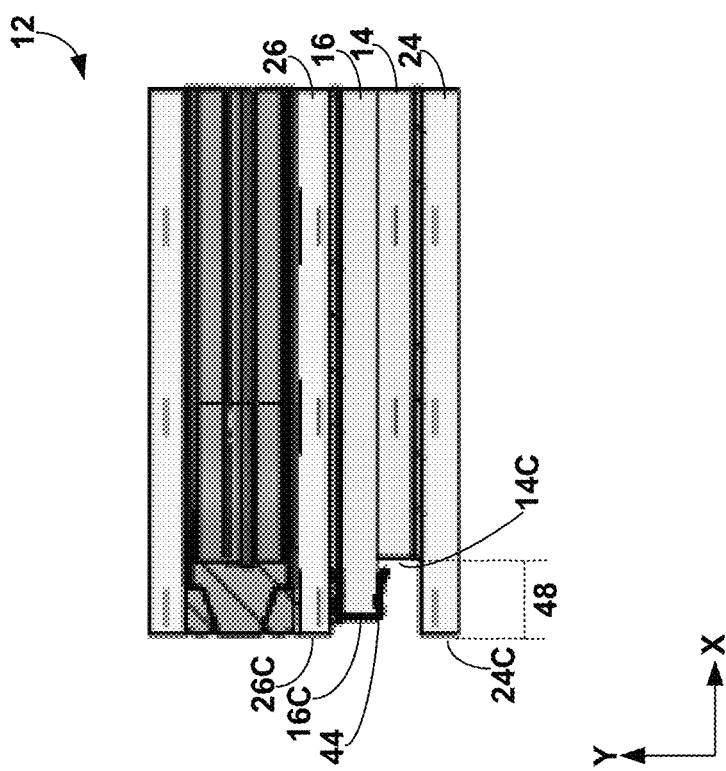
FIG. 4 is a first side view of the privacy glazing structure taken along the B-B sectional line indicated on FIG. 3.
Figure 6:
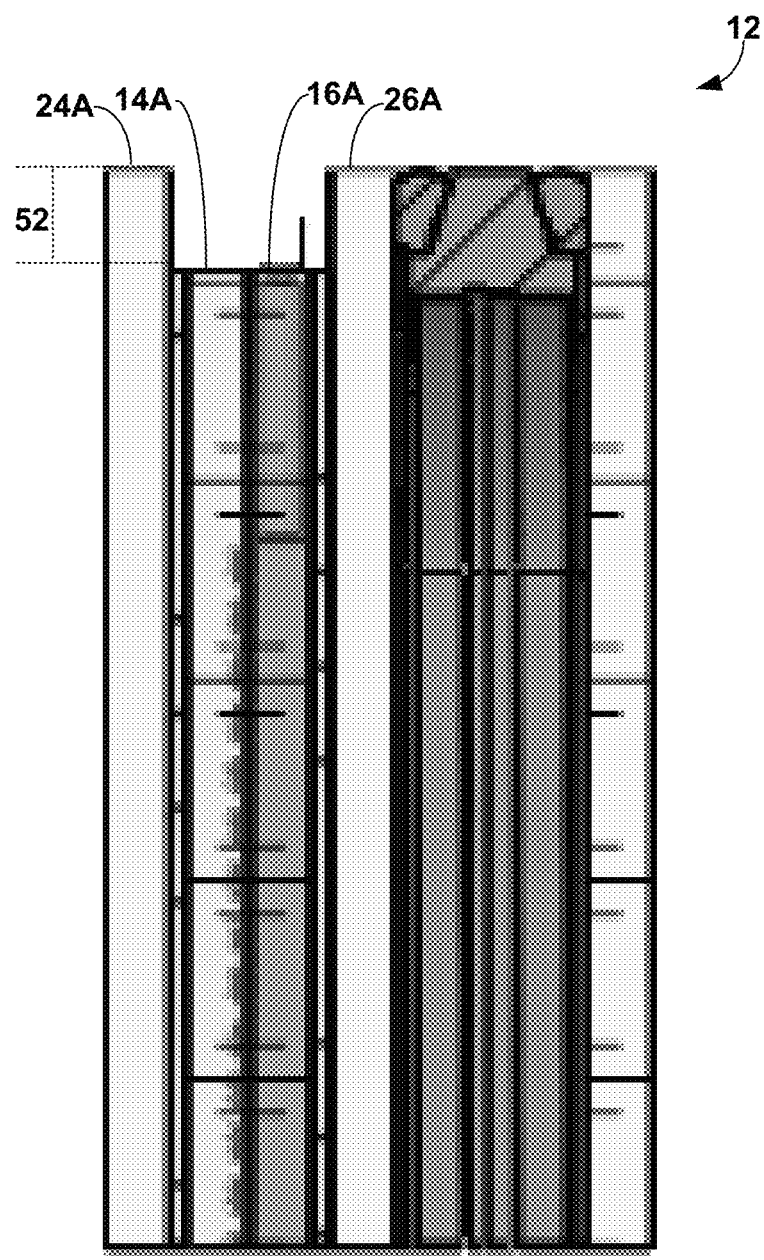
FIG. 6 is a top view of the privacy glazing structure taken along the A-A sectional line indicated on FIG. 3.

FIG. 1 is a side view of an example privacy glazing structure 12, which is illustrated as having panes with flush edge surfaces but which may be implemented with offset panes as described in greater detail with respect to FIGS. 4-6. In FIG. 1, privacy glazing structure 12 includes a first pane of transparent material 14 and a second pane of transparent material 16 with a layer of optically active material 18 bounded between the two panes of transparent material. The privacy glazing structure 12 also includes a first electrode layer 20 and a second electrode layer 22. The first electrode layer 20 is carried by the first pane of transparent material 14 while the second electrode layer 22 is carried by the second pane of transparent material. In operation, electricity supplied through the first and second electrode layers 20, 22 can control the optically active material 18 to control visibility through the privacy glazing structure.

The first and second panes of transparent material 14, 16 can each be implemented using laminated panes that include a laminate layer with an outer sandwiching pane. For example, in FIG. 1, privacy glazing structure 12 includes a third pane of transparent material 24 and a fourth pane of transparent material 26. A first laminate layer 28 bonds the first pane of transparent material 14 to the third pane of transparent material 24. A second laminate layer 30 bonds the second pane of transparent material 16 to the fourth pane of transparent material 26. In particular, the first pane of transparent material 14 can define an inner face on the side of the pane facing optically active material 18 and an outer face on an opposite side of the pane. Similarly, the second pane of transparent material 16 can define an inner face on the side of the pane facing optically active material 18 and an outer face on an opposite side of the pane. First laminate layer 28 may contact the outer face of the first pane of transparent material 14, or a coating deposited thereover, and an opposed face of the third pane of transparent material 24 to bond the two panes together. Second laminate layer 30 may contact the outer face of the second pane of transparent material 16, or a coating deposited thereover, and an opposed face of the fourth pane of transparent material 26 to bond the two panes together.

In some configurations, privacy glazing structure 12 is implemented as a privacy cell where the panes of the structure are joined together without intervening spacer to define a between-pane space. In other configurations, however, including the configuration of FIG. 1, privacy glazing structure 12 includes a fifth pane of material 32 spaced apart from the privacy cell by a spacer 34 to define a between-pane space 36. The addition of one or more between-pane spaces, which may be filled with insulative gas, can be useful to increase the thermal performance of the privacy glazing structure. This can be beneficial for window, door, and skylight applications.

As described in greater detail below, one or more panes of transparent material in privacy glazing structure 12 may be offset relative to one or more other panes of the structure. This can provide one or more recesses in which electrical connection features of the structure can be bonded and/or routed. The positioning of the panes relative to each other may be different along different edge surfaces of the structure. Additionally or alternatively, first electrode layer 20 and/or second electrode layer 22 may be positioned offset relative to one or more peripheral edges of the structure. Independent of the positioning of the panes of transparent material relative to each other, the positioning of one or both electrode layers relative to one or more edges may help establish and maintain the electrical integrity of the privacy glazing structure during service. Privacy glazing structure 12 can have additional or alternative features and configurations, as described herein.

Privacy glazing structure 12 can utilize any suitable privacy materials for the layer of optically active material 18. Further, although optically active material 18 is generally illustrated and described as being a single layer of material, it should be appreciated that a structure in accordance with the disclosure can have one or more layers of optically active material with the same or varying thicknesses. In general, optically active material 18 is configured to provide controllable and reversible optical obscuring and lightening. Optically active material 18 can be an electronically controllable optically active material that changes direct visible transmittance in response to changes in electrical energy applied to the material.

In one example, optically active material 18 is formed of an electrochromic material that changes opacity and, hence, light transmission properties, in response to voltage changes applied to the material. Typical examples of electrochromic materials are $WO_3$ and $MoO_3$, which are usually colorless when applied to a substrate in thin layers. An electrochromic layer may change its optical properties by oxidation or reduction processes. For example, in the case of tungsten oxide, protons can move in the electrochromic layer in response to changing voltage, reducing the tungsten oxide to blue tungsten bronze. The intensity of coloration is varied by the magnitude of charge applied to the layer.

In another example, optically active material 18 is formed of a liquid crystal material. Different types of liquid crystal materials that can be used as optically active material 18 include polymer dispersed liquid crystal (PDLC) materials and polymer stabilized cholesteric texture (PSCT) materials. Polymer dispersed liquid crystals usually involve phase separation of nematic liquid crystal from a homogeneous liquid crystal containing an amount of polymer, sandwiched between electrode layers 20 and 22. When the electric field is off, the liquid crystals may be randomly scattered. This scatters light entering the liquid crystal and diffuses the transmitted light through the material. When a certain voltage is applied between the two electrode layers, the liquid crystals may homeotropically align and the liquid crystals increase in optical transparency, allowing light to transmit through the crystals.

In the case of polymer stabilized cholesteric texture (PSCT) materials, the material can either be a normal mode polymer stabilized cholesteric texture material or a reverse mode polymer stabilized cholesteric texture material. In a normal polymer stabilized cholesteric texture material, light is scattered when there is no electrical field applied to the material. If an electric field is applied to the liquid crystal, it turns to the homeotropic state, causing the liquid crystals to reorient themselves parallel in the direction of the electric field. This causes the liquid crystals to increase in optical transparency and allows light to transmit through the liquid crystal layer. In a reverse mode polymer stabilized cholesteric texture material, the liquid crystals are transparent in the absence of an electric field (e.g., zero electric field) but light scattering upon application of an electric field.

In one example in which the layer of optically active material 18 is implemented using liquid crystals, the optically active material includes liquid crystals and a dichroic dye to provide a guest-host liquid crystal mode of operation. When so configured, the dichroic dye can function as a guest compound within the liquid crystal host. The dichroic dye can be selected so the orientation of the dye molecules follows the orientation of the liquid crystal molecules. In some examples, when an electric field is applied to the optically active material 18, there is little to no absorption in the short axis of the dye molecule, and when the electric field is removed from the optically active material, the dye molecules absorb in the long axis. As a result, the dichroic dye molecules can absorb light when the optically active material is transitioned to a scattering state. When so configured, the optically active material may absorb light impinging upon the material to prevent an observer on one side of privacy glazing structure 12 from clearly observing activity occurring on the opposite side of the structure.

When optically active material 18 is implemented using liquid crystals, the optically active material may include liquid crystal molecules within a polymer matrix. The polymer matrix may or may not be cured, resulting in a solid or liquid medium of polymer surrounding liquid crystal molecules. In addition, in some examples, the optically active material 18 may contain spacer beads (e.g., micro-spheres), for example having an average diameter ranging from 3 micrometers to 40 micrometers, to maintain separation between the first pane of transparent material 14 and the second pane of transparent material 16.

In another example in which the layer of optically active material 18 is implemented using a liquid crystal material, the liquid crystal material turns hazy when transitioned to the privacy state. Such a material may scatter light impinging upon the material to prevent an observer on one side of privacy glazing structure 12 from clearly observing activity occurring on the opposite side of the structure. Such a material may significantly reduce regular visible transmittance through the material (which may also be referred to as direct visible transmittance) while only minimally reducing total visible transmittance when in the privacy state, as compared to when in the light transmitting state. When using these materials, the amount of scattered visible light transmitting through the material may increase in the privacy state as compared to the light transmitting state, compensating for the reduced regular visible transmittance through the material. Regular or direct visible transmittance may be considered the transmitted visible light that is not scattered or redirected through optically active material 18.

Another type of material that can be used as the layer of optically active material 18 is a suspended particle material. Suspended particle materials are typically dark or opaque in a non-activated state but become transparent when a voltage is applied. Other types of electrically controllable optically active materials can be utilized as optically active material 18, and the disclosure is not limited in this respect.

Independent of the specific type of material(s) used for the layer of optically active material 18, the material can change from a light transmissive state in which privacy glazing structure 12 is intended to be transparent to a privacy state in which visibility through the insulating glazing unit is intended to be reduced. Optically active material 18 may exhibit progressively decreasing direct visible transmittance when transitioning from a maximum light transmissive state to a maximum privacy state. Similarly, optically active material 18 may exhibit progressively increasing direct visible transmittance when transitioning from a maximum privacy state to a maximum transmissive state. The speed at which optically active material 18 transitions from a generally transparent transmission state to a generally opaque privacy state may be dictated by a variety factors, including the specific type of material selected for optically active material 18, the temperature of the material, the electrical voltage applied to the material, and the like.

Depending on the type of material used for optically active material 18, the material may exhibit controllable darkening. As noted above, controllable darkening refers to the ability of the optically active material to transition between a high visible light transmission state (a bright state), a low visible light transmission dark state, and optionally intermediate states therebetween, and vice versa, by controlling an external energy source applied to the optically active material. When optically active material 18 is so configured, the visible transmittance through the cell containing optically active material 18 (e.g., in addition to other substrates and/or laminate layers bounding the optically active material and forming the cell) may be greater than 40% when optically active material 18 is transitioned to the high visible transmission state light state, such as greater than 60%. By contrast, the visible transmittance through the cell may be less than 5 percent when optically active material 18 is transitioned to the low visible light transmission dark state, such as less than 1%. Visible transmittance can be measured according to ASTM D1003-13.

Additionally or alternatively, optically active material 18 may exhibit controllable light scattering. As noted above, controllable light scattering refers to the ability of the optically active material to transition between a low visible haze state, a high visible haze state, and optionally intermediate states therebetween, and vice versa, by controlling an external energy source. When optically active material 18 is so configured, the transmission haze through the cell containing optically active material 18 may be less than 10% when optically active material 18 is transitioned to the low visible haze state, such as less than 2%. By contrast, the transmission haze through the cell may be greater than 85% when optically active material 18 is transitioned to the high visible haze state and have a clarity value below 50%, such as a transmission haze greater than 95% and a clarity value below 30%. Transmission haze can be measured according to ASTM D1003-13. Clarity can be measured using a BYK Gardener Haze-Gard meter, commercially available from BYK-GARDNER GMBH.

To electrically control optically active material 18, privacy glazing structure 12 in the example of FIG. 1 includes first electrode layer 20 and second electrode layer 22. Each electrode layer may be in the form of an electrically conductive coating deposited on or over the surface of each respective pane facing the optically active material 18. First electrode layer 20 can be deposited over an inner surface of the first pane of transparent material, while second electrode layer 22 can be deposited over an inner surface of the second pane of transparent material. The first and second electrode layers 20, 22 can be deposited directly on the inner surface of a respective pane or can be deposited on one or more intermediate layers, such as a blocker layer positioned between the inner surface of the pane and the electrode layer.

Each electrode layer 20, 22 may be an electrically conductive coating that is a transparent conductive oxide ("TCO") coating, such as aluminum-doped zinc oxide and/or tin-doped indium oxide. The transparent conductive oxide coatings can be electrically connected to a power source through electrodes as described in greater detail below. In some examples, the transparent conductive coatings forming electrode layers 20, 22 define wall surfaces of a cavity between first pane of transparent material 14 and second pane of transparent material 16 which optically active material 18 contacts. In other examples, one or more other coatings may overlay the first and/or second electrode layers 20, 22, such as a dielectric overcoat (e.g., silicon oxynitride). In either case, first pane of transparent material 14 and second pane of transparent material 16, as well as any coatings on the inner faces of the panes can form a cavity or chamber containing optically active material 18.

For example, one or both of the panes of transparent material 14, 16 bounding the optically active material can have an alignment layer bounding and contacting optically active material 18. The alignment layer can be deposited over any underlying layers carried by the pane, such as an electrode layer, an underlying transparent dielectric blocking layer (e.g., silicone oxide), and/or transparent dielectric overcoat. The alignment layer can help reduce or eliminate Mura (blemish) defects, e.g., by changing the surface energy and/or surface interactions between optically active material 18 and the surface of pane contacting the optically active material. In one example, the alignment layer is implemented by a layer containing polyimide (e.g., formed by coating the surface with a coating containing polyimide). The polyimide layer may or may not be rubbed to modify the properties of the layer and corresponding interactions with optically active layer 18.

In some examples, privacy glazing structure 12 includes one or more functional coatings that enhance the performance, optical characteristics, and/or reliability of the privacy glazing structure. One type of functional coating that may be included on the privacy glazing structure is a low emissivity coating. In general, a low emissivity coating is a coating that is designed to allow near infrared and visible light to pass through a pane while substantially preventing medium infrared and far infrared radiation from passing through the panes. A low-emissivity coating may include one or more layers of infrared-reflection film interposed between two or more layers of transparent dielectric film. The infrared-reflection film may include a conductive metal like silver, gold, or copper. The transparent dielectric film may include one or more metal oxides, such an oxide of zinc, tin, indium, bismuth, titanium, hafnium, zirconium, and alloys and combinations thereof and/or silicon nitride and/or silicon oxynitride. Advantageous low-emissivity coatings include the LoE-180™, LoE-272™, and LoE-366™ coatings available commercially from Cardinal CG Company of Spring Green, Wisconsin, U.S.A. Additional details on low emissivity coating structures that can be used for privacy glazing structure 12 can be found in U.S. Pat. No. 7,906,203, the entire contents of which are incorporated herein by reference.

In different examples, the low emissivity coating may include one, two, three, or more layers of infrared-reflection film separated by intervening layers of transparent dielectric film. In general, the more layers of infrared reflection film in the low emissivity coating the better the coating is able to reject undesirable wavelengths of light, such as light within the ultraviolet spectrum. In some configurations, privacy glazing structure 12 includes a low emissivity coating having at least two layers of infrared reflection film, such as two or three layers of infrared reflection film. Each layer may include at least 10 nanometers of metal (e.g., gold, silver), such as at least 20 nanometers of metal.

When privacy glazing structure 12 includes a low emissivity coating, the coating may be placed on any desired surface of the glazing unit. In general, the surfaces of privacy glazing structure 12 are numbered sequentially starting with a surface of the glass that is facing an external (e.g., outside environment). When privacy glazing structure 12 in the example of FIG. 1 is positioned so that the fifth pane of transparent material 32 is exposed to an exterior environment and the third pane of transparent material 24 is exposed to an interior environment, the surface of the fifth pane of transparent material 32 exposed to the exterior environment may be designated the #1 surface while the opposite surface of the pane facing between-pane space 36 may be designated the #2 surface. Continuing with this example, the surface of the fourth pane of transparent material 26 facing the between-pane space 36 may be designated the #3 surface while the opposite surface of the fourth pane of transparent material in contact with second laminate layer 30 may be designated the #4 surface. The numbering of the pane surfaces may continue sequentially in this manner.

When a low emissivity coating is used, the low emissivity coating may be positioned on any surface of any transparent pane of privacy glazing structure 12, including on multiple surfaces of the same or different transparent panes of the insulating glass unit. In instances when privacy glazing structure 12 includes one low emissivity coating, for example, the coating may be positioned on the #1, #2, or #3 surfaces of unit. For example, FIG. 1 illustrates a low emissivity coating 40 deposited on the #2 surface of the unit, which is the surface of fifth pane of transparent material 32 exposed to between-pane space 36. In some examples in which privacy glazing structure 12 includes two surfaces coated with a low emissivity coating (which may be the same or different configurations), the low emissivity coatings may be positioned on the #1 and #2 surfaces, the #2 and #3 surfaces, the #1 and #3 surfaces, or any other desired combination of surfaces.

The panes of transparent material forming privacy glazing structure 12, including first pane 14, second pane 16, third pane 24, fourth pane 26, and fifth pane 32, can be formed of any suitable material. Each pane of transparent material may be formed from the same material, or at least one of the panes of transparent material may be formed of a material different than at least one other of the panes of transparent material. In some examples, at least one (and optionally all) the panes of privacy glazing structure 12 are formed of glass. In other examples, at least one (and optionally all) the privacy glazing structure 12 are formed of plastic such as, e.g., a fluorocarbon plastic, polypropylene, polyethylene, or polyester. When glass is used, the glass may be aluminum borosilicate glass, sodium-lime (e.g., sodium-lime-silicate) glass, or another type of glass. In addition, the glass may be clear or the glass may be colored, depending on the application. Although the glass can be manufactured using different techniques, in some examples the glass is manufactured on a float bath line in which molten glass is deposited on a bath of molten tin to shape and solidify the glass. Such an example glass may be referred to as float glass.

When one or more of the panes of privacy glazing structure 12 are fabricated from glass, one or more of the panes (and optionally all of the panes) may be fabricated from thermally strengthened glass. One example of a thermally-strengthened glass is tempered glass. Tempered glass is generally fabricated by heating the glass unit the glass reaches a stress-relief point temperature (which may be referred to as the annealing temperature) and thereafter rapidly cooling the glass to induce compressive stresses in the surface of the glass. Tempered glass may exhibit a surface compression of greater than 10,000 pounds per square inch (psi), as determined in accordance with ASTM C1048-04. Another example of a thermally-strengthened glass is Heat Strengthened glass, which may exhibit a strength between tempered glass and annealed glass. Annealed glass is generally fabricated by heating the glass until the glass reaches a stress-relief point temperature (which may also be referred to as the annealing temperature) and thereafter slowly cooling the glass to relieve internal stresses. In some examples, Heat Strengthened glass exhibits a surface compression of approximately 5,000 psi, as determined in accordance with ASTM C1048-04.

In various examples, first laminate layer 28 and second laminate layer 30 may be formed of polyvinyl butyral (PVB), ethylene-vinyl acetate (EVA), thermoplastic polyurethane (TPU), a ionomer film such as SentryGlas® material available from DuPont®, or yet other suitable polymeric material. Each laminate layer may be formed of the same material, or the two laminate layers may be formed of different materials. In some configurations, first laminate layer 28 and/or second laminate layer 30 may have a thickness ranging from 0.005 inches (0.127 mm) to 0.25 inches (6.35 mm), such as from 0.01 inches (0.254 mm) to 0.1 inches (2.54 mm), or from 0.015 inches (0.381 mm) to 0.09 inches (2.286 mm). In some examples, first laminate layer 28 and/or second laminate layer 30 has a thickness greater than 0.03 inches (0.762 mm) and less than 0.1 inches (2.54 mm). In other examples, first laminate layer 28 and/or second laminate layer 30 has a thickness less greater than 0.01 inches (0.254 mm) and less than 0.04 inches (1.08 mm). The thickness of first laminate layer 28 may be the same as or different than the thickness of second laminate layer 30.

In some examples, the thicknesses of the panes of transparent material forming privacy glazing structure 12 are greater than the thickness of the first and/or second laminate layers. For example, the thickness of each of the panes of transparent material may range from 0.5 mm to 8 mm, such as from 1 mm to 6 mm, from 2 mm to 4 mm.

Privacy glazing structure 12 can have a variety of different pane constructions and configurations. For example, various laminated glass arrangements can be used to impart different structural and/or functional properties to the privacy glazing structure. Additional details on privacy glazing substrate arrangements that can be used in the present disclosure can be found in US Published Patent Application No. 2018/0307111, titled "HIGH PERFORMANCE PRIVACY GLAZING STRUCTURES" and filed Apr. 20, 2018, the entire contents of which are incorporated herein by reference.

In the example of FIG. 1, privacy glazing structure 12 includes a between-pane space 36 formed by a spacer 34. Spacer 34 may extend around the entire perimeter of the multi-pane privacy glazing structure to hermetically seal the between-pane space 36 from gas exchange with a surrounding environment. To minimize thermal exchange across the structure, between-pane space 36 can be filled with an insulative gas or even evacuated of gas. For example, between-pane space 36 may be filled with an insulative gas such as argon, krypton, or xenon. In such applications, the insulative gas may be mixed with dry air to provide a desired ratio of air to insulative gas, such as 10 percent air and 90 percent insulative gas. In other examples, between-pane space 36 may be evacuated so that the between-pane space is at vacuum pressure relative to the pressure of an environment surrounding privacy glazing structure 12.

Spacer 34 can be any structure that holds opposed substrates in a spaced apart relationship over the service life of privacy glazing structure 12 and seals between-pane space 36 between the opposed panes of material, e.g., so as to inhibit or eliminate gas exchange between the between-pane space and an environment surrounding the unit. One example of a spacer that can be used as spacer 34 is a tubular spacer positioned between fifth pane of transparent material 32 and fourth pane of transparent material 26. The tubular spacer may define a hollow lumen or tube which, in some examples, is filled with desiccant. The tubular spacer may have a first side surface adhered (by a first bead of sealant) to the surface of the fifth pane of transparent material 32 and a second side surface adhered (by a second bead of sealant) to the fourth pane of transparent material 26. A top surface of the tubular spacer can exposed to between-pane space 36 and, in some examples, includes openings that allow gas within the between-pane space to communicate with desiccating material inside of the spacer. Such a spacer can be fabricated from aluminum, stainless steel, a thermoplastic, or any other suitable material. Advantageous glazing spacers are available commercially from Allmetal, Inc. of Itasca, IL, U.S.A.

Another example of a spacer that can be used as spacer 34 is a spacer formed from a corrugated metal reinforcing sheet surrounded by a sealant composition. The corrugated metal reinforcing sheet may be a rigid structural component that holds fifth pane of transparent material 32 apart from fourth pane of transparent material 26. Such a spacer is often referred to in commercial settings as swiggle spacer. In yet another example, spacer 34 may be formed from a foam material surrounded on all sides except a side facing a between-pane space with a metal foil. Such a spacer is commercially available from Edgetech under the trade name Super Spacer®. As another example, spacer 34 may be a thermoplastic spacer (TPS) spacer formed by positioning a primary sealant (e.g., adhesive) between fifth pane of transparent material 32 and fourth pane of transparent material 26 followed, optionally, by a secondary sealant applied around the perimeter defined between the substrates and the primary sealant. Spacer 34 can have other configurations, as will be appreciated by those of ordinary skill in the art.

Privacy glazing structure 12 can be used in any desired application, including in a door, a window, a wall (e.g., wall partition), a skylight in a residential or commercial building, or in other applications. To help facilitate installation of privacy glazing structure 12, the structure may include a frame or sash surrounding the exterior perimeter of the structure. In different examples, the frame or sash may be fabricated from wood, metal, or a plastic material such a vinyl. The frame or sash may define a channel that receives and holds the external perimeter edge of structure.

Figure 2:
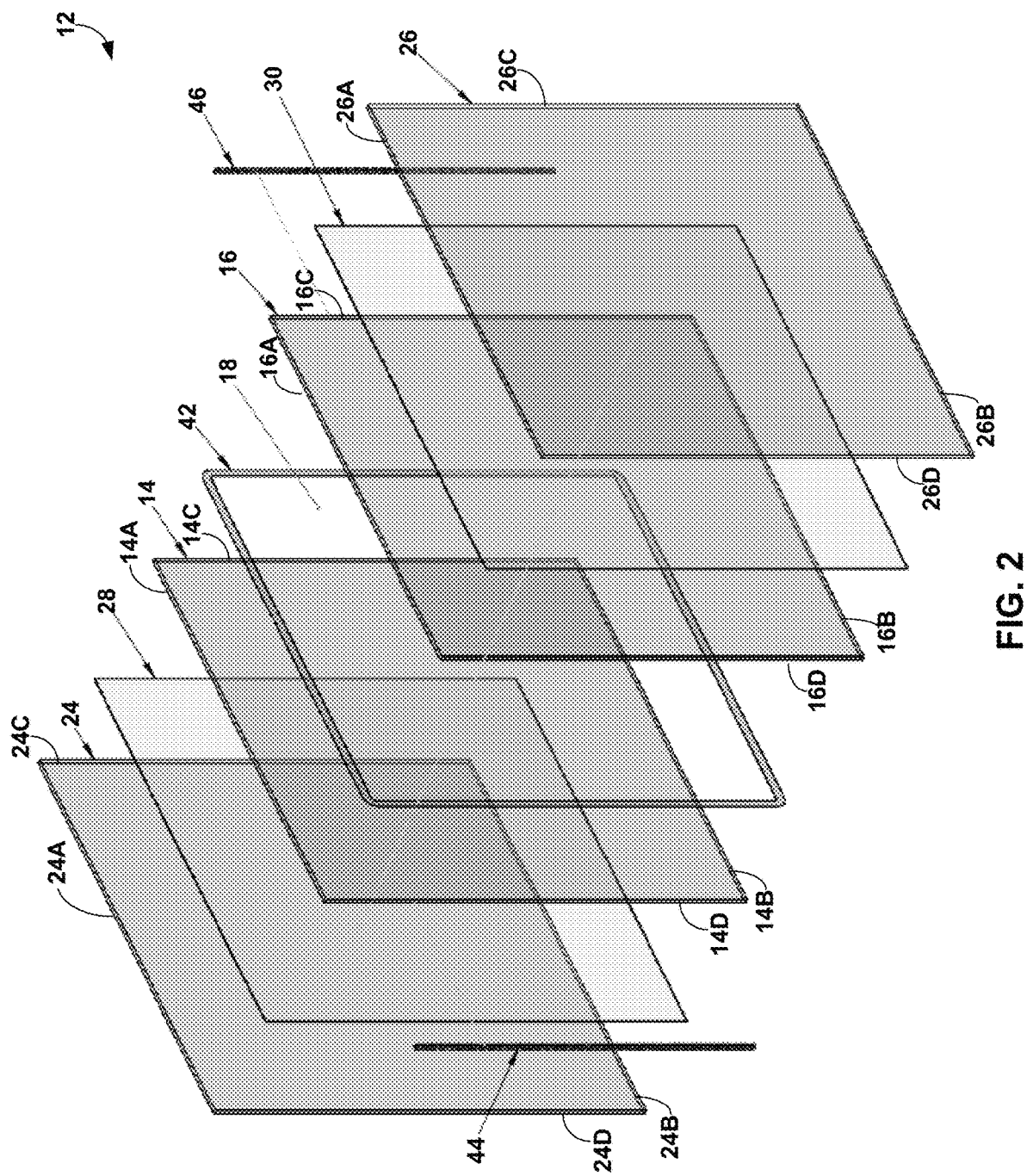
FIG. 2 is an exploded perspective view of an example configuration of the privacy glazing structure of FIG. 1.

FIG. 2 is an exploded perspective view of an example configuration of privacy glazing structure 12, where like reference numerals refer to like elements discussed above with respect to FIG. 1. As shown in FIG. 2, privacy glazing structure 12 includes previously-described first pane of transparent material 14, second pane of transparent material 16, and optically active material 18. Privacy glazing structure 12 also includes third pane of transparent material 24 bonded to first pane of transparent material 14 by first laminate layer 28 and fourth pane of transparent material 26 bonded to second pane of transparent material 16 by second laminate layer 30. Privacy glazing structure 12 in FIG. 2 is also illustrated as having a seal 42 surrounding optically active material 18 and enclosing the optically active material between the first and second panes of transparent material. In addition, privacy glazing structure 12 includes at least one electrode for connecting first electrode layer 20 (FIG. 1) and second electrode layer 22 (FIG. 1) to a power source. In FIG. 2, the at least one electrode is illustrated as being implemented using two electrodes: a first electrode 44 and a second electrode 46.

Each pane of privacy glazing structure 12 may have multiple edges that define the boundaries of the pane. For example, first pane of transparent material 14 is illustrated as having a top edge 14A, a bottom edge 14B, a first side edge 14C, and a second side edge 14D. Second pane of transparent material 16 is illustrated as having a top edge 16A, a bottom edge 16B, a first side edge 16C, and a second side edge 16D. Similarly, third pane of transparent material 24 is illustrated as having a top edge 24A, a bottom edge 24B, a first side edge 24C, and a second side edge 24D. Finally, in FIG. 2, fourth pane of transparent material 26 is illustrated as having a top edge 26A, a bottom edge 26B, a first side edge 26C, and a second side edge 26D. It should be appreciated that references to the top, bottom, and sides are relative positional references made with respect to gravity and the typical orientation of privacy glazing structure 12 in use, however, a structure according to the disclosure is not limited to any particular orientation.

In general, each pane of transparent material in privacy glazing structure 12 can define any desired shape, including a polygonal shape (e.g., square, rectangular, hexagonal, trapezoid), an arcuate shape (e.g., circular, elliptical) shape, or combinations of polygonal and arcuate shapes (e.g., rectangle transitioning into a semi-circle). Typically, each pane of transparent material in privacy glazing structure 12 will be of the same shape (e.g., square, rectangular) but may or may not have different sizes as discussed herein.

To bond and/or seal the first pane of transparent material 14 to the second pane of transparent material 16 with optically active material 18 between the two panes, seal 42 may be positioned between the two panes. The seal may be implemented using one or more polymeric sealants that are positioned to extend around the perimeter of the first pane of transparent material 14 and the second pane of transparent material 16, e.g., adjacent to and/or in contact with the peripheral edge surface of the panes. The sealant(s) may bond the first pane of transparent material 14 to the second pane of transparent material 16 about their perimeter, e.g., to prevent ingress or egress of liquid from the region bounded by the sealant(s). For example, the sealants may hold liquid optically active material 18 between the panes within the region bounded by the sealant(s) and/or inhibit external moisture from reaching the optically active material.

As briefly mentioned above, the panes of transparent material forming privacy glazing structure 12, whether implemented alone as a cell or in the form of a multiple-pane structure with a between-pane space, can be arranged to provide electrical connection regions to facilitate making electrical connections with first electrode layer 20 and second electrode layer 22. In some examples, the positions of the panes are coordinated relative to each other to achieve robust yet compact electrical connections.

In one configuration, a side edge of the first pane of transparent material 14 is recessed relative to a corresponding side edge of third pane of transparent material 24. This can provide a first recess in which an electrode contact pad on second pane of transparent material 16 is exposed for bonding first electrode 44. In addition, a side edge of the second pane of transparent material 16 can be recessed relative to a corresponding side edge of fourth pane of transparent material 26. This can provide a second recess in which an electrode contact pad on first pane of transparent material 14 is exposed for bonding second electrode 46. In combination with configuring privacy glazing structure 12 with side recesses, the bottom edges of the first pane of transparent material 14 and the second pane of transparent material 16 may be flush with each other. In addition, the bottom edges of these panes may also be flush with the bottom edges of the third pane of transparent material 24 And the fourth pane of transparent material 26. In this way, the edges of the panes bounding optically active material 18 may be asymmetrically positioned with respect to corresponding edges of the outer sandwiching or laminate panes.

Figure 3:
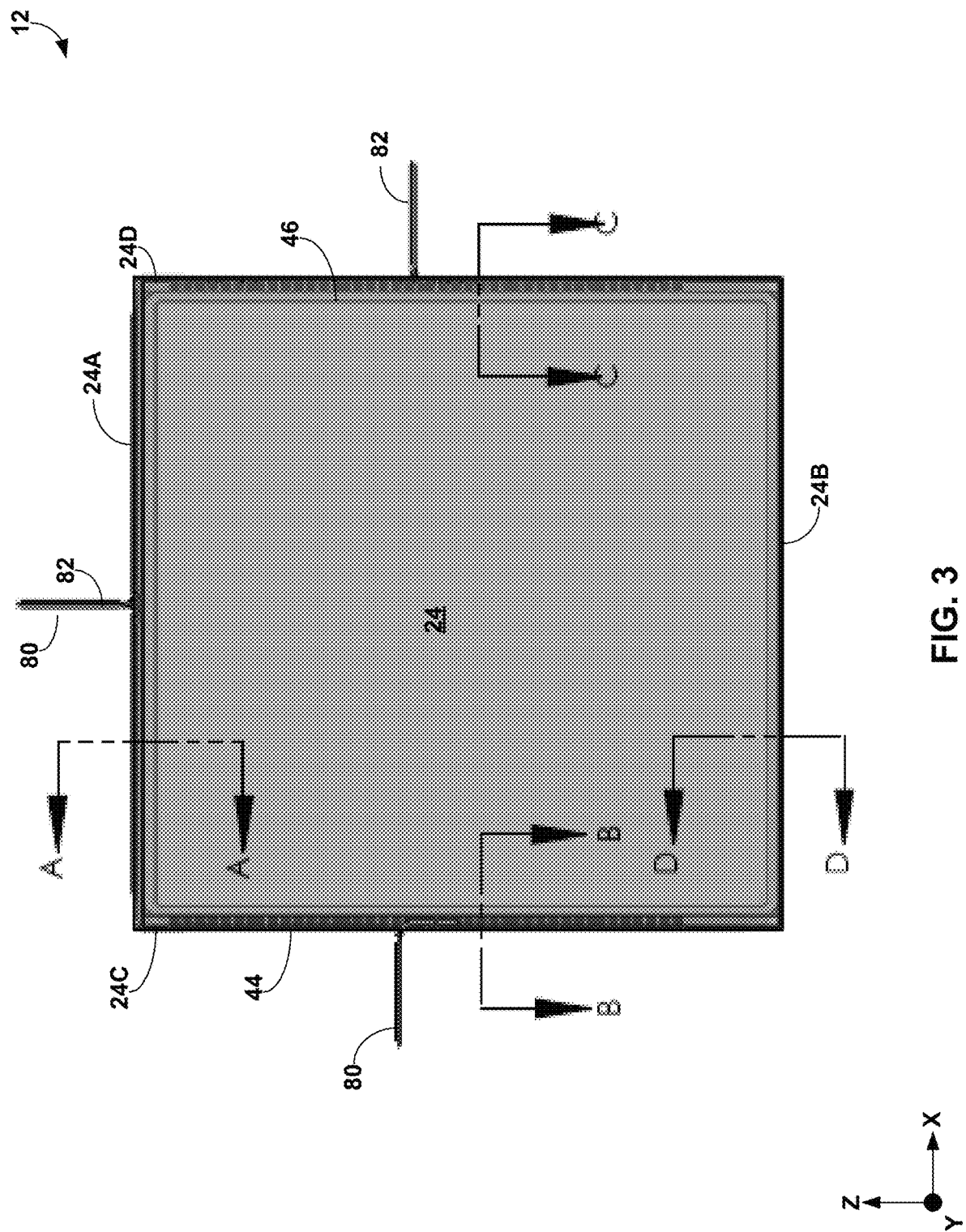
FIG. 3 is a side view of the privacy glazing structure from FIG. 1 from the perspective of the fourth pane of transparent material in the structure.
Figure 7:
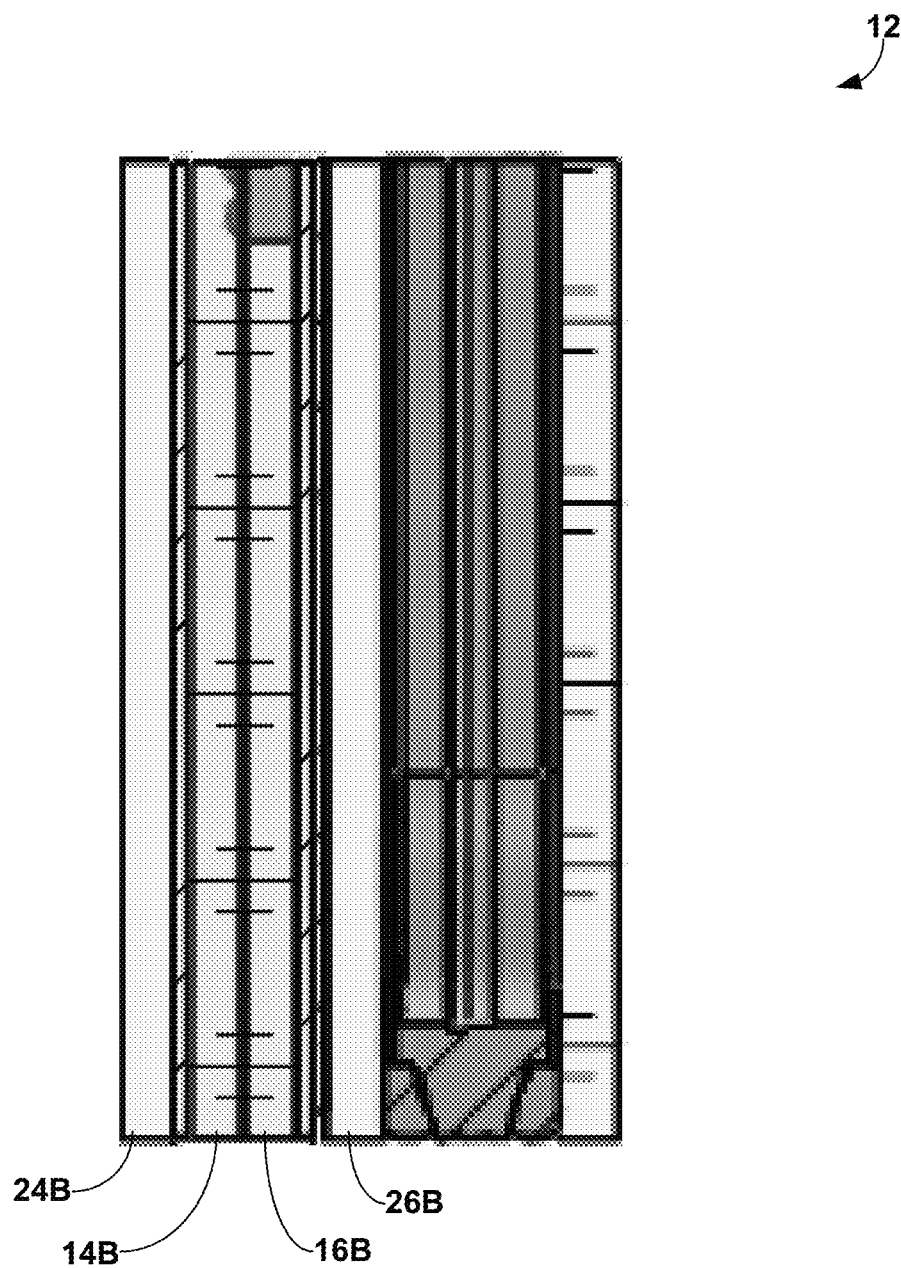
FIG. 7 is a bottom view of the privacy glazing structure taken along the D-D sectional line indicated on FIG. 3

FIG. 3 is a side view of privacy glazing structure 12 from FIG. 1 from the perspective of fourth pane of transparent material 26. FIG. 3 illustrates four sectional views to be described in greater detail below with reference to FIGS. 4-7. FIG. 4 is a first side view of privacy glazing structure 12 taken along the B-B sectional line indicated on FIG. 3. FIG. 5 is a second side view of privacy glazing structure 12 taken along the C-C sectional line indicated on FIG. 3. FIG. 6 is a top view of privacy glazing structure 12 taken along the A-A sectional line indicated on FIG. 3. Further, FIG. 7 is a bottom view of privacy glazing structure 12 taken along the D-D sectional line indicated on FIG. 3.

With reference to FIG. 4, the first side sectional view of privacy glazing structure 12 illustrates first side edges 14C, 16C, 24C, and 26C of the first, second, third, and fourth panes of transparent material, respectively. As shown, first side edge 14C of first pane of transparent material 14 is recessed relative to first side edge 24C of third pane of transparent material 24. The side edge 14C of the first pane of transparent material 14 is recessed relative to the first side edge 24C of third pane of transparent material 24 in that it is offset inwardly (e.g., toward the center of the structure). This can provide a first recessed space defined, collectively, by first side edge 14C of the first pane of transparent material, the inner surface of the second pane of transparent material 16, and the third pane of transparent material 24. First electrode 44 can be positioned partially or fully in this first recess space and bonded (e.g., mechanically and/or electrically coupled) to second electrode layer 22 within the space.

In various configurations, the first side edge 16C of the second pane of transparent material 16 may or may not be recessed relative to the first side edge 24C of the third pane of transparent material 24. For example, in FIG. 4, first side edge 16C of the second pane of transparent material 16 is illustrated as being recessed relative to the first side edge 24C of the first pane of transparent material and also the first side edge 26C of the fourth pane of transparent material 26. In the illustrated configuration, the first side edge 14C of the first pane of transparent material 14 is recessed relative to the first side edge 16C of the second pane a transparent material 16, and both side edges are recessed relative to the outer sandwiching third and fourth panes. When so configured, first side edge 14C of first pane of transparent material 14 is recessed deeper than the first side edge 16C of the second pane of transparent material 16.

The third pane of transparent material 24 and fourth pane of transparent material 26 may or may not be flush along the first side of privacy glazing structure 12 relative to each other. In FIG. 4, first side edge 24C of third pane of transparent material 24 is depicted as being flush with the first side edge 26C of the fourth pane of transparent material 26. This may be useful, for example, to provide a pair of outermost edges that provide mechanical stability and/or physical protection for the privacy structure.

With reference to FIG. 5, the second side sectional view of privacy glazing structure 12 illustrates second side edges 14D, 16D, 24D, and 26D of the first, second, third, and fourth panes of transparent material, respectively. As shown, second side edge 16D of second pane of transparent material 16 is recessed relative to second side edge 26D of fourth pane of transparent material 26. The side edge 16D of the second pane of transparent material is recessed relative to the second side edge 26D of the fourth pane of transparent material and that is offset inwardly (e.g., toward the center of the structure). This can provide a second recess space defined, collectively, by second side edge 16D of the second pane of transparent material, the inner surface of the first pane of transparent material 14, and the fourth pane of transparent material 26. Second electrode 46 can be positioned partially or fully in this second recess space and bonded (e.g., mechanically and/or electrically coupled) to first electrode layer 20 within the space.

In various configurations, the second side edge 14D of the first pane of transparent material 14 may or may not be recessed relative to the second side edge 26D of the fourth pane of transparent material 26. For example, in FIG. 4, second side edge 14D of the first pane of transparent material 14 is illustrated as being recessed relative to the second side edge 26D of the fourth pane of transparent material and also the second side edge 24D of the third pane of transparent material 24. In the illustrated configuration, the second side edge 16D of the second pane of transparent material 16 is recessed relative to the second side edge 14D of the first pane of transparent material 14, and both side edges are recessed relative to the outer sandwiching third and fourth panes. When so configured, second side edge 16D the second pane of transparent material 16 is recessed deeper than the second side edge 14D of the first pane of transparent material 14.

The third pane of transparent material 24 and fourth pane of transparent material 26 may or may not be flush along the second side of privacy glazing structure 12 relative to each other. In FIG. 5, second side edge 24D of third pane of transparent material 24 is depicted as being flush with the second side edge 26D of the fourth pane of transparent material 26. Again, this may be useful, for example, to provide a pair of outermost edges that provide mechanical stability and/or physical protection for the privacy structure.

The depth that first pane of transparent material 14 is recessed relative to third pane of transparent material 24 on the first side and the depth that the second pane of transparent material 16 is recessed relative to the fourth pane of transparent material 26 on the second side may vary, for example, depending on the size and configuration of electrode to be attached to a corresponding exposed electrode layer. In some configurations, privacy glazing structure 12 defines a first side recess distance 48 (FIG. 4) and a second side recess distance 50 (FIG. 5) that is less than 12.5 mm, such as less than 10 mm, less than 9 mm, or less than 7 mm. For example, first side recess distance 48 and/or second side recess distance 50 may range from approximately 4 mm to approximately 8 mm, such as approximately 6 mm. In other examples, first side recess distance 48 and second side recess distance 50 may be less than approximately 4 mm, such as from 1 mm to 4 mm. Appropriately sizing first side recess distance 48 and second side recess distance 50 may provide sufficient real estate for bonding each electrode with an exposed electrode layer while minimizing the sight line impact of the recess. While first side recess distance 48 and second side recess distance 50 may be the same such that privacy glazing structure 12 is configured with symmetrical side recesses, in other configurations, the distances may be different (with first side recess distance 48 being greater than or less than second side recess distance 50).

When first side edge 16C of second pane of transparent material 16 is also recessed relative to first side edge 24C and/or 26C of third transparent pane 24 and/or fourth transparent pane 26, the distance the second transparent pane is recessed may be less than first side recess distance 48. For example, the distance may range from 10% to 90% of first side recess distance 48, such as less than 50% of first side recess distance 48. The distance may be sufficient, in some configurations, to allow electrode 44 to wrap around the side edge of the transparent pane to which it is bonded without projecting past the side edges of the third and fourth transparent panes.

Similarly, when second side edge 14D of first pane of transparent material 14 is recessed relative to second side edge 24D and/or 26D of third transparent pane 24 and/or fourth transparent pane 26, the distance the first pane is recessed may be less than second side recess distance 50. For example, the distance may range from 10% to 90% of second side recess distance 50, such as less than 50% of second side recess distance 50. The distance may be sufficient, in some configurations, to allow electrode 46 to wrap around the side edge of the transparent pane to which it is bonded without projecting past the side edges of the third and fourth transparent panes.

It should be appreciated that although the first and second panes of transparent material 14, 16 are shown recessed on the first and second sides, respectively, for establishing recessed spaces to facilitate electrode bonding, the direction in which the panes are recessed may be reversed. In other words, first pane of transparent material 14 may be recessed on its second side while second pane of transparent material 16 is recessed on its first side to define recessed spaces in which electrodes are bounded. Thus, it should be appreciated that the pane and edge numbering scheme described with respect to the drawings is for purposes of illustration, and the disclosure is not limited in this respect.

In some configurations, the top edge 14A of the first pane of transparent material 14 and/or the top edge 16A of the second pane of transparent material 16 may be recessed relative to one or more top edges of the outer third and fourth transparent panes. This top recess may provide a space or cavity in which wiring can be routed from electrodes 44, 46 before exiting privacy glazing structure 12 for connection to an external power source.

FIG. 6 is a top sectional view taken along the A-A sectional line shown on FIG. 3 illustrating an example configuration of the top edges of the panes in privacy glazing structure 12. In this illustration, the top edge 14A of the first pane of transparent material is recessed relative to the top edge of the third pane of transparent material 24. Further, the top edge 16A of the second pane of transparent material 16 is recessed relative to the top edge of the fourth pane of transparent material 26. This results in a cavity or recessed top space having a width equal to the thickness of the first and second panes of transparent material 14, 16. By contrast, the first side recess may have a width equal to the thickness of the first pane of transparent material 14, and the second side recess may have a width equal to the thickness of the second pane transparent material 16.

Although FIG. 6 illustrates both the first and second panes of transparent material 14, 16 being recessed, in other configurations, only one of the two panes is recessed. For example, the top edge 14A of the first pane of transparent material 14 may be positioned flush with the top edge 24A of the third pane of transparent material (e.g., with the top edge 16A of the second pane of transparent material 16 being recessed relative to both substrates). Alternatively, the top edge 16A of the second pane of transparent material 16 may be positioned flush with the top edge 26A of the fourth pane of transparent material (e.g., with the top edge 14A of the first pane of transparent material 16 being recessed relative to both substrates).

Independent of whether the top edges 14A and 16A of the first and second panes of transparent material 14, 16 are recessed, the top edges 24A and 26A of the third and fourth panes of transparent material 24, 26 may or may not be flush with each other. In FIG. 6, top edge 24A of third pane of transparent material 24 is depicted as being flush with top edge 26A of the fourth pane of transparent material 26. This may be useful to provide a pair of flush edge surfaces, for example, to provide outermost top edges that provide mechanical stability and/or physical protection for the privacy structure.

The recess defined along the top of privacy glazing structure 12 may have a maximum depth 52, which may be referred to as a top recess distance. Top recess distance 52 may be less than 12.5 mm, such as less than 10 mm, less than 7 mm, or less than 5 mm. For example, top recess distance 52 may range from approximately 2 mm to approximately 6 mm, such as approximately 3 mm. In practice, top recess distance 52 may or may not be sized smaller than first side recess distance 48 and second side recess distance 50. The top recess may be smaller in that there recess may only need to accommodate wire routing and not electrode bonding. Further, minimizing the size of the top recess may be useful to minimize the amount of space in which moisture may attempt to collect.

When the size of top recess is less than the size of the first and second side recesses, a ratio of the first side recess distance 48 divided by the top recess distance 52 and also a ratio of the second side recess distance 50 divided by the top recess distance 52 may each be greater than 1. For example, the ratios may each be greater than 1.1, such as greater than 1.2 or greater than 1.5. For example, the rations may each be within a range from 1.1 to 2.5, such as from 1.1 to 1.5 or from 1.5 to 2.5. Accordingly, the depth the top recess may be sized proportionally to the depth of the side recesses to account for in a related but different electrical connection features (e.g., wiring versus electrodes) that may be positioned in the different recesses.

As briefly discussed above, the bottom edges of the panes of privacy glazing structure 12 may be arranged flush with each other. FIG. 7 is a bottom sectional view taken along the D-D sectional line shown on FIG. 3 illustrating an example configuration of the bottom edges of the panes in privacy glazing structure 12. In this illustration, the bottom edge 14B of the first pane of transparent material 14 is flush with the bottom edge 16B of the second pane of transparent material 16 as well as the bottom edge 24B of the third pane of transparent material 24 and the bottom edge 26B of the fourth pane of transparent material 26. As a result, the bottom edges of all four panes are flush with each other. When implemented as part of an insulating unit that includes a between-pane space, the bottom edge of the fifth pane of transparent material on the opposite side of the between-pane space may also be flush with the other panes in the structure. While FIG. 7 illustrates the bottom edges of the panes of privacy glazing structure 12 may be arranged flush with each other, in other configurations, one or more panes may be offset relative to one or more other panes (e.g., to define a bottom recess).

To form privacy glazing structure 12 with one or more side recesses and, optionally, a top recess, panes of different size may be assembled together. In one configuration, privacy glazing structure 12 is fabricated using two different sized panes of material. Third pane of transparent material 24 and fourth pane of transparent material 26 may be of the same size (e.g., length and width), while first pane of transparent material 14 and second pane of transparent material 16 may also be of the same size (e.g., length and width) which is different than that of the third and fourth panes. In particular, the first pane of transparent material 14 and second pane of transparent material 16 may have a shorter width (measured side to side) than the third pane of transparent material 24 and the fourth pane of transparent material 26. The width may be shorter by a distance, e.g., ranging from 3 mm to 25 mm, such as from 6 mm to 18 mm. In addition, the first pane of transparent material 14 and second pane of transparent material 16 may have a shorter length (measured from top to bottom) than the third pane of transparent material 24 and the fourth pane transparent material 26. The length may be shorter by distance corresponding to the depth of the top recess once assembled. The foregoing pane size configurations are merely exemplary, and it should be appreciated that the disclosure is not limited in this respect unless otherwise noted.

To establish an electrical connection between wiring entering into privacy glazing structure 12 from an external power source and each electrode layer, one or more electrodes may be provided. Each electrode may be bonded to one of the electrode layers 20, 22 and also connected to wiring. Accordingly, the electrode may form the terminal end of the wiring can be connected to the electrode layer.

With further reference to FIGS. 2, 4, and 5, privacy glazing structure 12 is illustrated as including a first electrode 44 and a second electrode 46. First electrode 44 may be positioned in a first recessed notch defined by an offset section of the first pane of transparent material 14. By offsetting the first pane of transparent material 14, a portion of the second electrode layer 22 carried on the inner face of the second pane of transparent material may be exposed to the recessed space. First electrode 44 may be bonded to the second electrode layer 22 within the recess. Similarly, second electrode 46 may be positioned in a second recessed notch defined by an offset section of the second pane of transparent material 16. By offsetting the second pane of transparent material 16, a portion of the first electrode layer 20 carried on the inner face of the first pane of transparent material may be exposed to the recessed space. As a result, second electrode 46 may be bonded to the first electrode layer 20 within this recess.

In general, each electrode 44, 46 may be formed of an electrically conductive material (e.g., metal) and may have a cross-sectional area greater than that of the wire to which the electrode is attached. Each electrode 44, 46 can be implemented using any suitable electrode structure.

In one configuration, each electrode 44, 46 is formed by depositing a section of solder over a surface of a respective electrode layer. For example, each electrode 44, 46 may be formed by depositing a length of solder material via an ultrasonic deposition process on and/or over a respective electrode layer. First electrode 44 may be a length of solder deposited over second electrode layer 22 carried on the inner surface of second substrate 16 bounding the first side recess. Second electrode 46 may be a length of solder deposited over first electrode layer 20 carried on the inner face of first pane 14 bounding the second side recess. The length of each electrode formed of ultrasonically deposited solder may vary depending on the size of privacy glazing structure 12 and, in some examples, may be at least 50 mm long and 2 mm wide, such as at least 100 mm long and 2 mm wide. When an electrode layer includes a nonconductive overcoat layer, such as a metal oxide, metal nitride, and/or metal oxy-nitride coating, the solder material may penetrate the nonconductive overcoat layer to electrically communicate between the deposit electrode and the underlying electrode layer.

Figure 8:
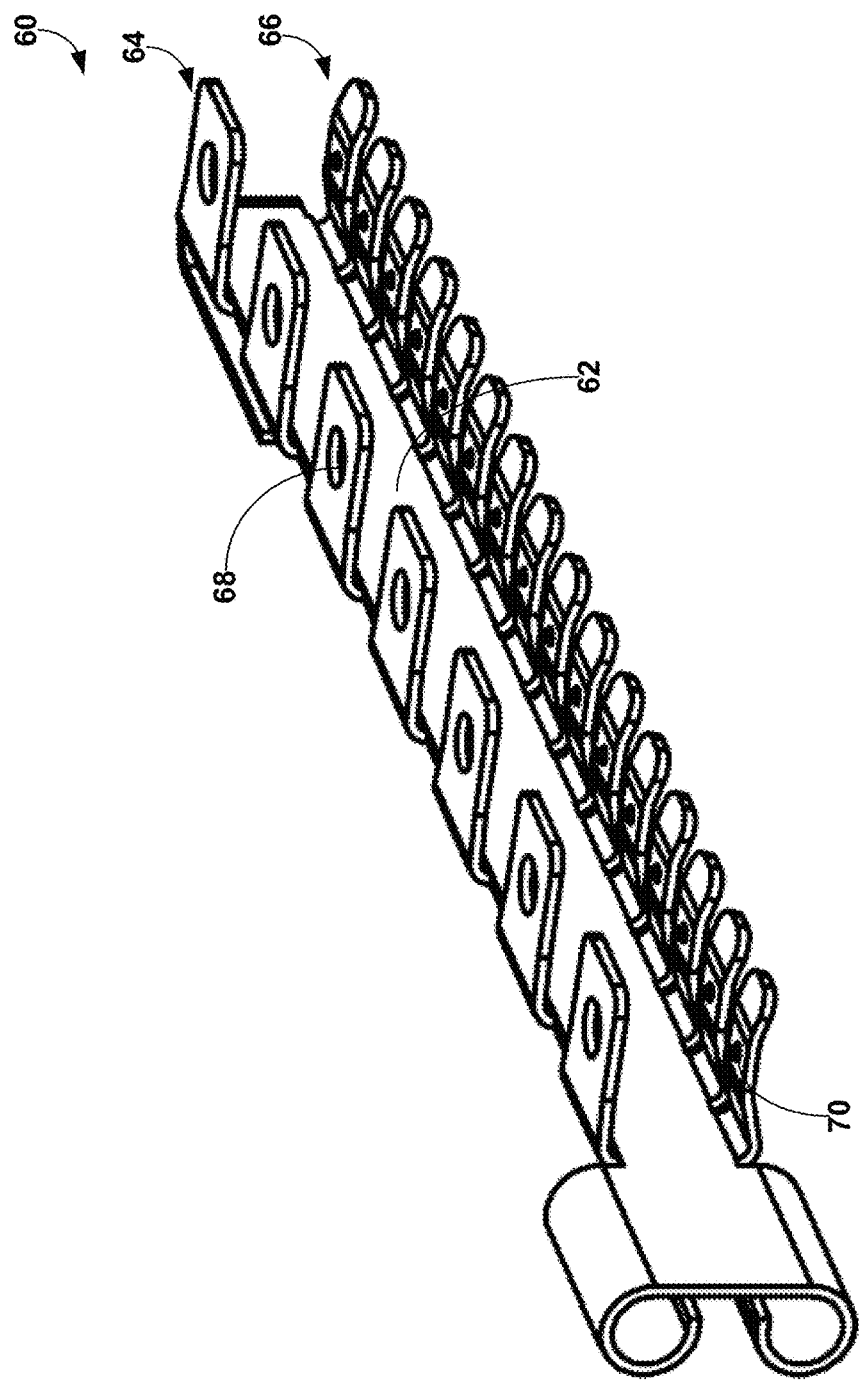
FIG. 8 is a perspective view of an example electrode configuration that may be used in the privacy glazing structure of FIG. 1.

As another example, electrodes 44, 46 may be implemented as a mechanical structure that wraps around the side edge of the respective pane to which the electrode is electrically coupled to the electrode layer carried by the pane. FIG. 8 is a perspective view of an example electrode 60 that may be used as electrodes 44 and/or 46 in privacy glazing structure 12 with a wraparound configuration. As shown in this example, electrode 60 has a base 62 from which a first leg 64 and a second leg 66 extend. The first and second leg 64, 66 are illustrated as extending generally perpendicularly from base 62 to define a U-shaped cross-section although may extend at different angles. In use, base 62 of electrode 60 may be positioned in contact with the side edge of the pane carrying the electrode layer to which the electrode is to be connected. First leg 64 may extend parallel to the outer face of the pane, and optionally in contact with the outer face. Second leg 66 may extend parallel to the inner face of the pane carrying the electrode layer.

To secure electrode 60 the pane, first leg 64 may be embedded in the laminate layer bonding the pane carrying the electrode layer to an adjacent pane. In one example, first leg 64 may be embedded in the laminate layer by laminating the two panes together and thereafter pushing electrode 60 on the side edge of the pane to which it is to be attached, causing first leg 64 to carve an opening into the laminate layer. In another example, electrode 60 may be attached to the side edge of the pane and the pane thereafter laminated to an adjacent pane. In this example, the laminate material bonding the two panes together may melt flow against and around first leg 64, causing the first leg to become embedded in the laminate layer. In either application, first leg 64 of electrode 60 may include a plurality of spaced apart fingers, optionally having a through-hole 68, which may provide interstitial space in which laminate material can flow for bonding the electrode.

Second leg 66 of electrode 60 can physically contact the underlying electrode layer to which the electrode is bonded to establish an electrical pathway from the electrode layer to the electrode. Second leg 66 of electrode 60 may have a plurality of spaced apart fingers which are angled or biased, causing the fingers to press against the inner surface of the pane against which the fingers are positioned with a biasing force. This can help maintain the electrode in contact with the underlying electrode layer. In some examples, each finger of second leg 66 includes a tooth 70. The tooth 70 may function to pierce an optional overcoat layer deposited over an electrode layer to which electrode 60 is attached, allowing the electrode to establish an electrical communication pathway through the overcoat layer.

Independent of the specific configuration of first electrode 44 and second electrode 46, the electrodes may each be attached to electrical wiring that extends from the respective electrode out of privacy glazing structure 12. With further reference to FIG. 3, example wire routings are illustrated. As shown, first electrode 44 is connected to a first section of electrical wiring 80. Further, second electrode 46 is connected to a second section of electrical wiring 82. The first section of electrical wiring 80 may be positioned in the first recess space defined by the offset panes and extend along at least a portion of the length (from top to bottom and/or vice versa) of the privacy glazing structure. The second section of electrical wiring 82 may be positioned in the second recess space defined by the offset panes and extend along at least a portion of the length (from top to bottom and/or vice versa) of the privacy glazing structure. In some configurations, one or both sections of electrical wiring exit privacy glazing structure 12 from a side edge of the structure. In other configurations, also illustrated in FIG. 3, one or both sections of electrical wiring exit privacy glazing structure 12 from the top edge of the structure. In this other configuration, the electrical wiring may be positioned in next and along the top recess defined by the offset panes. In general, the term wiring refers to any flexible or inflexible electrical conductor, such as a thread of metal optionally covered with an insulative coating, a flexible printed circuit, a bus bar, or other electrical connector.

To help secure electrical wiring 80, 82 in one or more recesses in which the wiring is routed and also provide an environmental barrier, the recesses of privacy glazing structure defined by the offset panes may be filled after attaching and routing the desired electrical connection features. For example, the side and/or top recesses of privacy glazing structure 12 may be filled with a polymeric material, e.g., until the polymeric material is flush with the edge surfaces of the third and fourth panes of transparent material. The polymeric filling material may encapsulate the electrical connection features within the recesses. Example polymeric filling materials that may be used includes silicone, epoxy, and polyurethane materials.

In addition to or in lieu of configuring privacy glazing structure 12 with offset panes as discussed above, the electrode layers 20, 22 of the privacy glazing structure may be arranged to help facilitate robust and reliable electrical operation during the service life of the structure. In some examples, each electrode layer is offset along the inner face of the pane on which the electrode layer is deposited, causing the electrode layer to be separated from the peripheral edge of the pane. This offset or separation between the peripheral edge of the pane and the electrode layer can be useful to help prevent electrical shorting in the event that moisture bypasses one or more seals and begins penetrating the peripheral edges of the structure. In practice, moisture ingress risk may be greatest along the bottom region of privacy glazing structure 12. For example, if environmental precipitation or moisture from other sources enters the sash or frame surrounding privacy glazing structure 12, the moisture may collect along the bottom surface of the sash or frame against which the bottom edge of privacy glazing structure 12 is positioned. Accordingly, while the electrode layer may be offset from the peripheral edge at any point along the perimeter of the pane (and, optionally, about the entire perimeter of the pane), in some configurations, the electrode layer is offset at least along the bottom edge of the pane. For example, the electrode layer may be offset along the bottom edge and at least a portion of the distance extending from the bottom edge up toward the top edge.

When privacy glazing structure 12 is configured with offset electrode layers, the offset may be established using a variety of different techniques. For example, the electrode layers may be removed (e.g. via grinding or laser ablation) over the desired region of offset and/or otherwise deactivated in the region. Alternatively, the electrode layers may be deposited on the panes so that the electrode layers do not extend over the desired region of offset.

Figure 9:
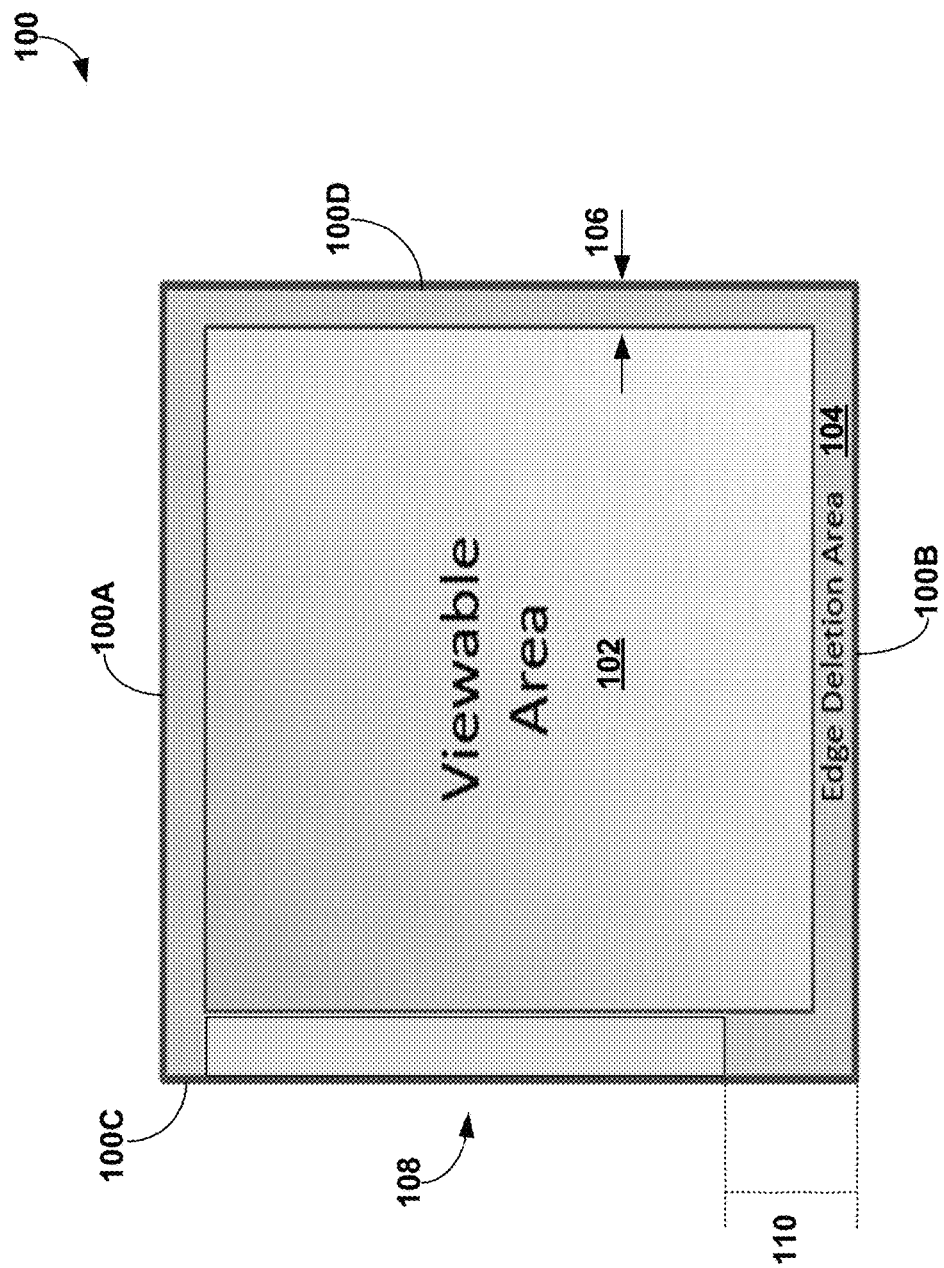
FIG. 9 is a front view of an example inner face of a pane of transparent material showing an example electrode layer offset configuration that can be used in the privacy glazing structure of FIG. 1.

FIG. 9 is a front view of an example inner face of a pane of transparent material showing an example electrode layer offset configuration that can be used for first electrode layer 20 and/or second electrode layer 22. As shown in this example, a pane of transparent material 100 has an electrode layer 102 deposited on its inner face. The electrode layer 102 is offset from the peripheral edge of the pane of transparent material 100 toward a center of the pane. In particular, the electrode layer 102 is offset along at least a portion of a top edge 100A, a bottom edge 100n, a first side edge 100C, and a second side edge 100D of the pane of transparent material. This provides an electrical isolation region 104 on the inner face of the pane of transparent material 100 adjacent the first, second, top, and bottom edges of the pane.

The distance 106 the electrode layer 102 is offset from each edge of the pane may vary based on a variety of factors. For example, the distance may be different from different edges of the pane or may be uniform about the perimeter of the pane from all edges. Also, the distance 106 may vary based on the size and intended application of the structure. In some examples, the distance 106 ranges from 1 mm to 25 mm, such as from 3 mm to 13 mm.

While offsetting one or both electrode layers may be useful to help prevent electrical shorting in the event of water ingress, the electrode layers may nevertheless extend closer to and/or up to a peripheral edge over a region to facilitate engagement of the electrode 44, 46. In FIG. 9, for example, electrode layer 102 is illustrated as extending to first side edge 100C over a region 108 defining an electrode contact pad. Electrode contact pad 108 may form a boundary wall of a recessed space on privacy glazing structure 12, which an electrode being bonded to the contact pad within the recessed space.

In FIG. 9, offset region 104 is shown as extending around an entire perimeter of transparent pane 100 except over the region defining the electrode contact pad 108. In other examples, offset region 104 need not extend about an entire perimeter of the transparent pane except the region defined the electrode contact pad. In general, offset region 104 may extend along bottom edge 100B (e.g., along the entire length of the bottom edge) an upwardly from the bottom edge a minimum separation distance 110 (e.g., on both the first side 100C and the second side 100D). Minimum separation distance 110 may be the distance between the bottom edge 100B of the pane of transparent material 100 and the bottommost edge of the region defining the electrode contact pad 108. In some examples, separation distance 110 ranges from 50 mm to 200 mm, although the distance may vary depending on the size and configuration of privacy glazing structure 12.

When implemented on privacy glazing structure 12, the first and second panes of transparent material 14, 16 may each have corresponding electrode layer offset regions. The size and configuration of the offset regions may be the same for each pane or may be different. Further, although FIG. 9 a illustrates an electrode contact pad on a first side 100C of the pane of transparent material, in practice, one pane may have an electrode contact pad on a first side of the pane while another of the panes may have an electrode contact pad on a second side of the pane. In other words, the electrode layer and offset regions may be mere images of each other.

Privacy glazing structure 12 can have a variety of different wire routing configurations. In some implementations, wiring electrically connected to an electrode (e.g., electrode 44, electrode 46) is routed through one or more recesses defined between offset panes of the glazing structure. The one or more recesses can provide a channel in which wiring is positioned, allowing the wiring to be recessed relative to side edges of panes bounding the channel.

Wiring extending through one or more recesses defined between offset panes of privacy glazing structure 12 can exit a recess, for example for connection to a power source and/or electrical driver, at any desired location. FIG. 3 illustrates example locations where wiring 80, 82 can exit side and top recesses. In this illustrated configuration, wiring 80, 82 is shown bending in the plane (X-Z plane) of privacy glazing structure 12 to exit a recess in which the wiring runs. In other configurations, wiring may exit a recess in which it runs out of the plane of privacy glazing structure 12 by forming an opening through a face of a pane defining the channel in which the wiring runs. An opening may be formed through the planar face (X-Y plane) of a pane of material bounding and defining the channel, allowing the wiring to exit the recess through which it extends out of the plane of the privacy glazing structure.

Figure 10:
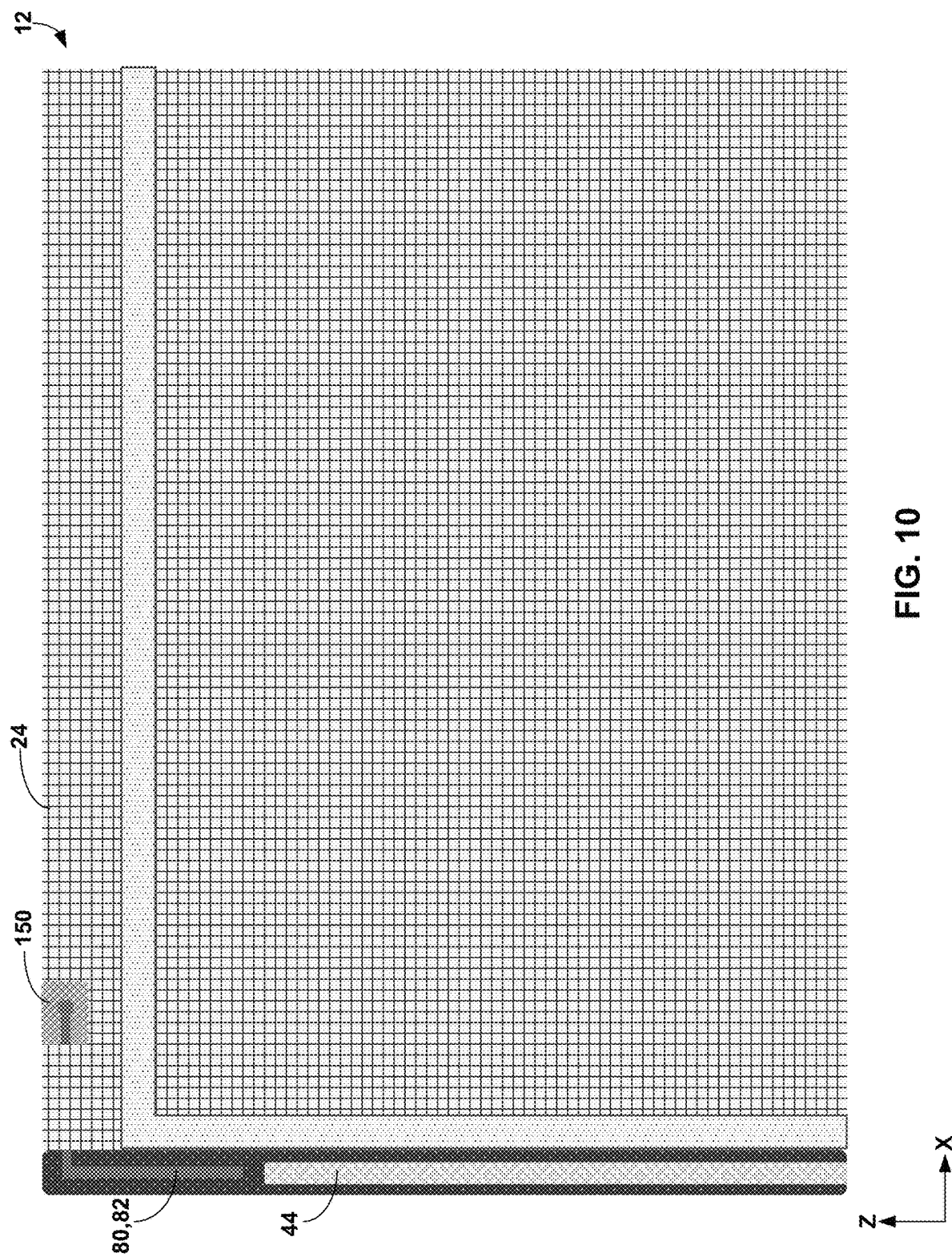
FIG. 10 illustrates an example configuration of a privacy glazing structure where wiring is routed within a recess defined by offset panes and exits the privacy glazing structure through the face of one of the panes defining the recess.

FIG. 10 illustrates an example configuration of privacy glazing structure 12 where wiring is routed within a recess defined by offset panes and exits the privacy glazing structure through the face of one of the panes defining the recess. In particular, FIG. 10 is an interior facing front view of privacy glazing structure 12 where the third pane of transparent material 24 is illustrated as being removed on the left side of the figure for purposes of illustrating electrode 44 and wiring 80, 82 positioned underneath the face of the pane (e.g., in a first side recess). These components can be positioned underneath the face of the pane by recessing a first side edge of first pane of transparent material 14 and/or second pane of transparent material 16 relative to third pane of transparent material 24 and/or fourth pane of transparent material 26. In the illustrated example, wiring 80, 82 is shown as electrically connected to electrode 44 and extending vertically upwards (in the Z-direction) within a first side recess. Wiring 80, 82 in the illustrated example turns from the first side recess into a top recess (in the X-direction), e.g., by making a 90 degree bend. Wiring 80, 82 then exits the top recess through an opening 150 defined in a portion of the third pane of transparent material defining the top recess. In this way, wiring 80, 82 may be entirely positioned within one or more recesses defined by privacy glazing structure 12 until the wiring turns out of plane with the privacy glazing structure and exits through a hole formed in a transparent pane of material defining a sidewall for one of the recesses.

Figure 11:
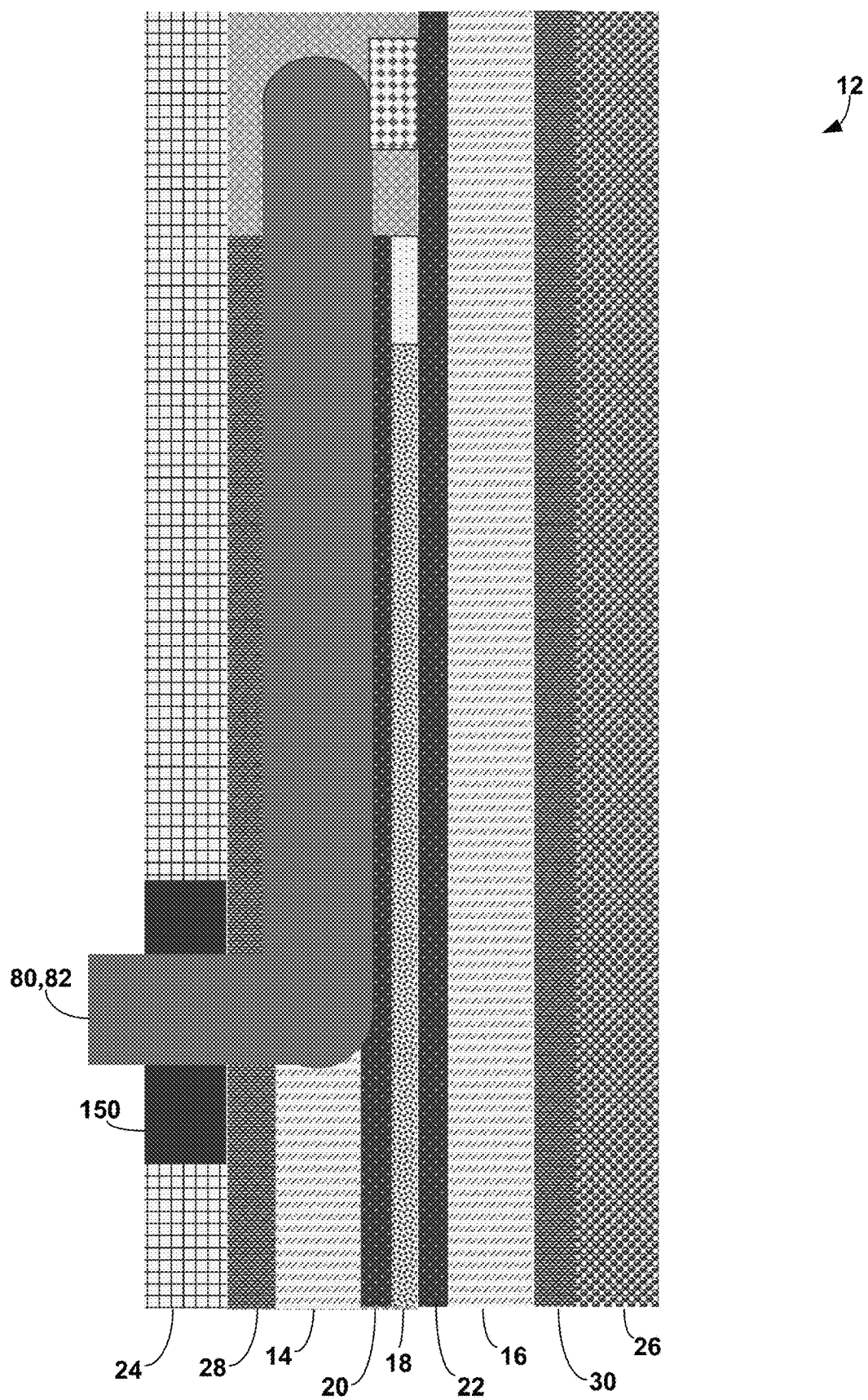
FIG. 11 is a top view of the example privacy glazing structure wire routing from FIG. 10.

FIG. 11 is a top view of privacy glazing structure 12 from FIG. 10 showing the example wire routing configuration from this perspective. As shown in this view, wiring 80, 82 extends through a top recess and parallel to the major faces of the panes of privacy glazing structure 12 before exiting the top recess through an opening 150 formed in the face of third pane of transparent material 24. Opening 150 can be positioned at any desired location along a length of privacy glazing structure 12, e.g., between the first and second side edges of the structure. This can provide flexibility for a manufacturer or designer to route wires at any desired location along the length of the structure for making electrical connections.

In some implementations, opening 150 is a hole formed in the face of third pane of transparent material 24 that is completely surrounded and bounded by the material defining the pane. Accordingly, when wiring 80, 82 is routed through opening 150, the wiring may be completely surrounded by the material defining the pane as it passes through the opening. In other implementations, opening 150 may be a notch extending from the edge of third pane of transparent material 24 (e.g., top edge) to a depth in the pane where wiring 80, 82 is desired to exit the recess. When so configured, wiring may be surrounded on all sides except the side where the notch was formed into the pane with the material defining the pane. In various examples, opening 150 may be formed by creating a hole in the pane (e.g., via mechanical or laser drilling) or by creating a notch in the pane. In general, opening 150 may be positioned at a location shallower than the depth of the recess in which wiring is routed. For example, when the edge of first pane of transparent material 14 and/or the edge of second pane of transparent material 16 are offset relative to the edge of third pane of transparent material 24, opening 150 may be positioned between the edge of third pane of transparent material 24 and the offset edge of first pane of transparent material 14 and/or second pane of transparent material 16.

Opening 150 may have any suitable shape, such as a circular or other arcuate shape and/or a polygonal shape, such as a square or rectangle. Opening 150 may typically be sized to closely conform to the size of wiring 80, 82 intended to be routed through the opening. For example, opening 150 may have a size less than twice the size (e.g., width, length, or cross-sectional area) of the wiring intended to be routed through the opening. As an example, wiring positioned in recesses of privacy glazing structure 12 and opening 150 may have an outer diameter less than 4 mm, such as an outer diameter ranging from 1 mm to 3 mm. Opening 150 may be a circular hole having a diameter less than 6 mm, such as from 2 mm to 5 mm. Free space between the sidewalls defining opening 150 and wiring routed therethrough may optionally be filled with potting material (e.g., sealant).

FIGS. 10 and 11 illustrate one example wire routing configuration in which wiring exits through a sidewall of a pane defining a top recess. The wire routing configurations and techniques described above with respect to FIGS. 10 and 11 can be duplicated and/or implemented at other locations on privacy glazing structure 12. As one example, privacy glazing structure 12 may include a second wire routing extending from electrode 46 (e.g., on the right side of the privacy glazing structure). The second wiring may extend vertically upwards in a second side recess before turning into the top recess and exiting out the plane of the privacy glazing structure, as discussed above.

As a further example, wiring may exit directly through a first side recess and/or second side recess without extending into a top recess formed by privacy glazing structure 12. When so configured, hole(s) 150 may be positioned on a portion of third pane of transparent material 24 defining the first side recess and/or the second side recess.

As yet a further example, privacy glazing structure 12 may include a bottom recess in which a bottom edge 14B of first pane of transparent material 14 and/or a bottom edge 16B of second pane of transparent material 16 is recessed relative to a bottom edge 24B of third pane of transparent material 24 and/or a bottom edge 26B of fourth pane of transparent material 26. This can provide a bottom recess (analogous to the top recess described above). When so configured, the top edges of the panes defining privacy glazing structure 12 may be flush with each other or may define a recess. In either case, wiring connected to electrode 44 and/or electrode 46 may extend in the bottom recess of privacy glazing structure 12. The wiring may exit the bottom recess through one or more openings 150 formed in the portion of third pane of transparent material 24 defining and bounding the bottom recess.

While the foregoing description of wire routing configurations utilizing one or more holes extending through a face of one or more panes defining a recess of privacy glazing structure 12 as described the one or more holes 150 extending through third pane of transparent material 24, it should be appreciated that such holes may be formed through a different pane of the structure. For example, one or more holes 150 may extend through a face of fourth pane of transparent material 26. As another example, one or more holes 150 may extend through a face of third pane of transparent material 24 well one or more other holes 150 may extend through a face of fourth pane of transparent material 26. In this configuration, wiring from different electrodes may exit privacy glazing structure 12 to opposite faces of the structure.

As briefly mentioned above, privacy glazing structure 12 may be surrounded by a sash, e.g., to define a window or door component. The sash may be fabricated from a variety of different materials such as wood, metal (e.g., aluminum), and/or plastic (e.g., vinyl). The sash may define a channel in which privacy glazing structure 12 is inserted, with sidewalls of the channel extending partially over the face of privacy glazing structure 12. In practice, one or more setting blocks or other hardware may be positioned on the base of the channel with privacy glazing structure 12 resting on such features. For example, one or more setting blocks of a different material than the sash (e.g., rubber) may be placed on the base of the channel in privacy glazing structure 12 placed on the setting blocks.

To help maximize the sight line of privacy glazing structure 12 when inserted into a sash, one or more components of privacy glazing structure 12 may be notched in the region of the setting blocks or other hardware. This can facilitate positioning of privacy glazing structure 12 in the sash to maximize sight line.

Figure 12:
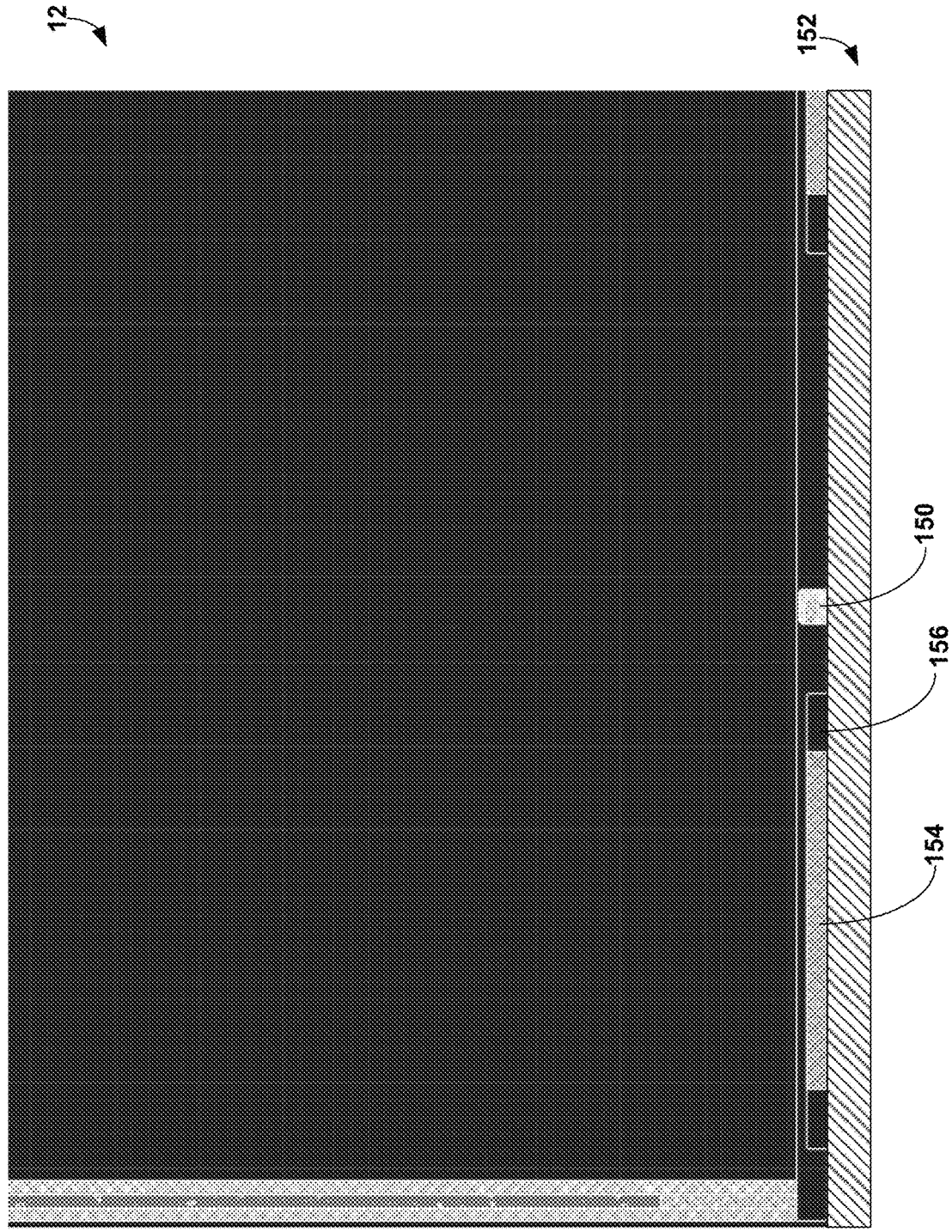
FIG. 12 is a partial front view of an example privacy glazing structure shown with the bottom surface of the glazing positioned in a sash.
Figure 13:
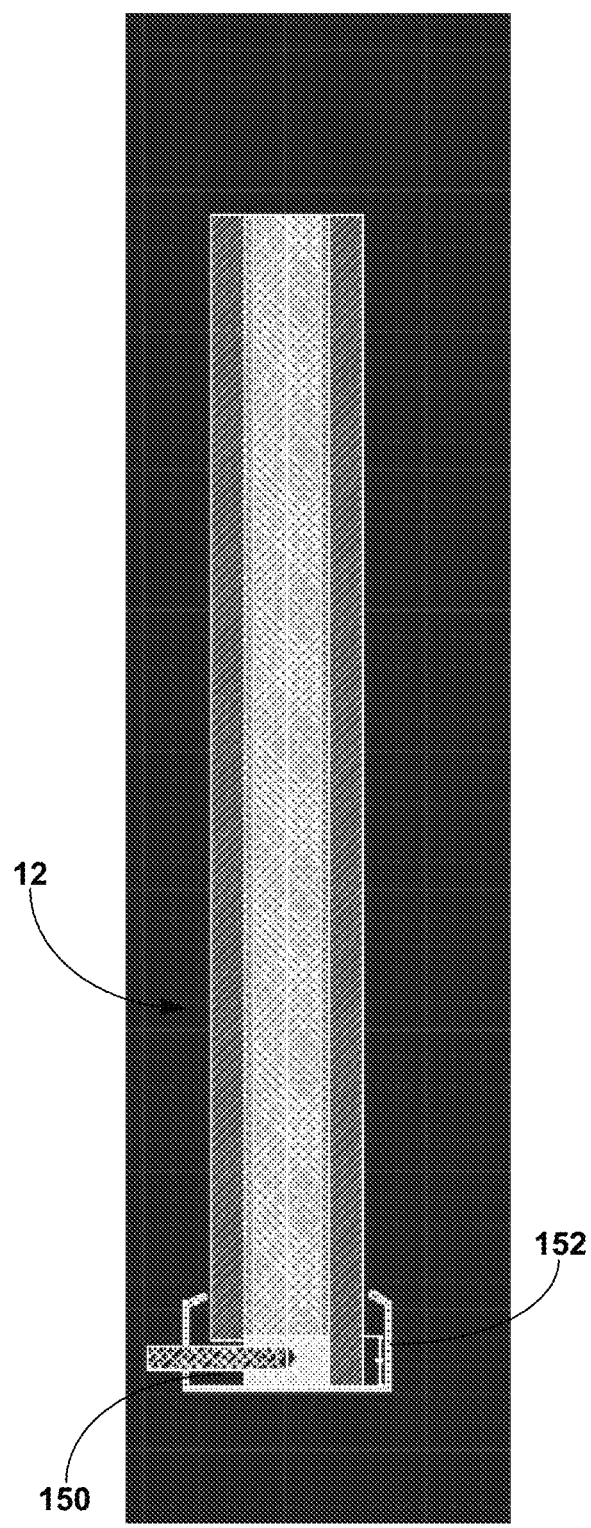
FIG. 13 is a side view of the example configuration of the privacy glazing of FIG. 12.

FIG. 12 is a partial front view of privacy glazing structure 12 shown with the bottom surface of the glazing positioned in a sash 152. In this configuration, privacy glazing structure 12 rests on setting blocks 154 or other window hardware positioned between the base of sash 152 and the bottom surface of the privacy glazing structure. As illustrated, a recess 156 is formed in the bottom edge of privacy glazing structure 12 that is configured (e.g., size and/or shaped) to receive setting block 154 (or other window hardware). Recess 156 may be formed of a variety of different ways, such as offsetting the bottom edge of first pane of transparent material 14 and/or the second pane of transparent material 16 relative to third pane of transparent material 24 and/or fourth pane of transparent material 26; cutting a notch through a cross-section of one or more of first pane of transparent material 14, second pane of transparent material 16, third pane of transparent material 26, fourth pane transparent material 28, first laminate layer 28 and/or second laminate layer 30. FIG. 13 is a side view of the example configuration of privacy glazing 12 inserted into the sash 152 shown with wiring 80, 82 exiting through an opening in the sidewall of the sash via opening 150 discussed above.

Various examples have been described. These and other examples are within the scope of the following claims.

The invention claimed is:

1. A privacy glazing structure comprising:
    a first pane of transparent material having an inner face and an outer face, the first pane of transparent material having a top edge, a bottom edge, a first side edge, and a second side edge;
    a second pane of transparent material having an inner face and an outer face, the second pane of transparent material having a top edge, a bottom edge, a first side edge, and a second side edge;
    a third pane of transparent material having a top edge, a bottom edge, a first side edge, and a second side edge;
    a fourth pane of transparent material having a top edge, a bottom edge, a first side edge, and a second side edge;
    a first laminate layer bonding the outer face of the first pane of transparent material to the third pane of transparent material;
    a second laminate layer bonding the out face of the second pane of transparent material to the fourth pane of transparent material;
    an electrically controllable optically active material positioned between the first pane of transparent material and the second pane of transparent material;
    a first electrode layer positioned over the inner face of the first pane of transparent material;
    a second electrode layer positioned over the inner face of the second pane of transparent material;
    wherein the first side edge of the first pane of transparent material is recessed relative to the first side edge of the third pane of transparent material and the first side edge of the fourth pane of transparent material,
    the second side edge of the second pane of transparent material is recessed relative to the second side edge of the third pane of transparent material and the second side edge of the fourth pane of transparent material,
    at least one of:
        a top recess is defined by at least one of the top edge of the first pane of transparent material and the top edge of the second pane of transparent material being recessed relative to the top edge of the third pane of transparent material and the top edge of the fourth pane of transparent material, and
        a bottom recess is defined by at least one of the bottom edge of the first pane of transparent material and the bottom edge of the second pane of transparent material being recessed relative to the bottom edge of the third pane of transparent material and the bottom edge of the fourth pane of transparent material,
    a first electrode is connected to the second electrode layer in a first recessed space defined, collectively, by the first side edge of the first pane of transparent material, the second pane of transparent material, and the third pane of transparent material, and
    a second electrode is connected to the first electrode layer in a second recessed space defined, collectively, by the second side edge of the second pane of transparent material, the first pane of transparent material, and the fourth pane of transparent material.

2. The structure of claim 1, further comprising a sash extending around a perimeter of the privacy glazing structure, wherein at least one of a setting block and a window hardware component is positioned on a bottom of the sash with a bottom edge of the privacy glazing structure defining a cutout in which the at least one of the setting block and window hardware component is received, the bottom edge of the privacy glazing structure resting on the at least one of the setting block and window hardware component within the sash.

3. The structure of claim 1, further comprising:
    a first section of electrical wiring electrically connected to the first electrode and extending through at least one of the first recessed space, the top recess, and the bottom recess before exiting the privacy glazing structure; and
    a second section of electrical wiring electrically connected to the second electrode and extending through at least one of the second recessed space, the top recess, and the bottom recess before exiting the privacy glazing structure.

4. The structure of claim 3, further comprising at least one hole is formed through at least one of the third pane of transparent material and the fourth pane of transparent material, wherein the first section of electrical wiring and the second section of electrical wiring exit the privacy glazing structure through the least one hole.

5. The structure of claim 3, further comprising a polymeric material filling the first recessed space and the second recessed space.

6. The structure of claim 3, wherein:
the first section of electrical wiring extends through the first recessed space and the top recess; and
a second section of electrical wiring extends through the top recess.

7. The structure of claim 1, comprising the top recess.

8. The structure of claim 1, comprising the top bottom recess.

9. The structure of claim 1, comprising both the top recess and the bottom recess.

10. The structure of claim 1, wherein:
the first electrodes comprises an elongated body that wraps around the first side edge of the second pane of transparent material, and
the second electrode comprises an elongated body that wraps around the second side edge of the first pane of transparent material.

11. The structure of claim 1, wherein the first and second electrodes are each formed of deposited solder material.

12. The structure of claim 11, further comprising a non-conductive overcoat layer deposited over each of the first and second electrode layers, wherein the deposited solder material penetrates the non-conductive overcoat layer.

13. The structure of claim 1, wherein the first side edge of the second pane of transparent material is also recessed relative to the first side edge of the third pane of transparent material and the first side edge of the fourth pane of transparent material.

14. The structure of claim 13, wherein the first side edge of the first pane of transparent material is recessed relative to the first side edge of the second pane of transparent material.

15. The structure of claim 1, wherein:
the second side edge of the first pane of transparent material is also recessed relative to the second side edge of the third pane of transparent material and the second side edge of the fourth pane of transparent material, and
the second side edge of the second pane of transparent material is recessed relative to the second side edge of the first pane of transparent material.

16. The structure of claim 1, wherein:
the first side edge of the third pane of transparent material is flush with the first side edge of the fourth pane of transparent material, and
the second side edge of the third pane of transparent material is flush with the second side edge of the fourth pane of transparent material.

17. The structure of claim 1, wherein the top edge of the first pane of transparent material is recessed relative to the top edge of the third pane of transparent material, and the top edge of the second pane of transparent material is recessed relative to the top edge of the fourth pane of transparent material.

18. The structure of claim 1, further comprising:
a fifth pane of transparent material generally parallel to the first, second, third, and fourth panes of transparent material, and
a spacer positioned between the fifth pane of transparent material and the fourth pane of transparent material to define a between-pane space, the spacer sealing the between-pane space from gas exchange with a surrounding environment and holding the fourth pane of transparent material a separation distance from the fifth pane of transparent material.

19. The structure of claim 1, wherein the first pane of transparent material, the second pane of transparent material, the third pane of transparent material, and the fourth pane of transparent material each comprise float glass.

20. The structure of claim 1, wherein the first electrode layer and the second electrode layer each comprise a transparent conductive oxide coating.

* * * * *